United States Patent
Zhang et al.

(10) Patent No.: US 12,358,479 B2
(45) Date of Patent: Jul. 15, 2025

(54) BRAKE SYSTEM OF VEHICLE, VEHICLE, AND CONTROL METHOD FOR BRAKE SYSTEM

(71) Applicant: Shenzhen Yinwang Intelligent Technologies Co., Ltd., Shenzhen (CN)

(72) Inventors: Yongsheng Zhang, Shanghai (CN); Donghao Liu, Shanghai (CN); Xiaokang Liu, Shanghai (CN); Wei Zhang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 600 days.

(21) Appl. No.: 17/657,222

(22) Filed: Mar. 30, 2022

(65) Prior Publication Data

US 2022/0219661 A1  Jul. 14, 2022

Related U.S. Application Data

(63) Continuation of application No. PCT/CN2020/113986, filed on Sep. 8, 2020.

(30) Foreign Application Priority Data

Sep. 30, 2019 (CN) .......................... 201910940787.2

(51) Int. Cl.
*B60T 13/16* (2006.01)
*B60T 7/04* (2006.01)
(Continued)

(52) U.S. Cl.
CPC ............ *B60T 13/165* (2013.01); *B60T 7/042* (2013.01); *B60T 8/171* (2013.01); *B60T 8/885* (2013.01);
(Continued)

(58) Field of Classification Search
CPC ...... B60T 13/165; B60T 13/686; B60T 8/171; B60T 8/885; B60T 2270/413;
(Continued)

(56) References Cited

U.S. PATENT DOCUMENTS 5,979,997 A    11/1999  Ohkubo et al.
9,205,824 B2 * 12/2015  Feigel .................... B60T 13/686
(Continued)

FOREIGN PATENT DOCUMENTS

CN    102582605 A    7/2012
CN    102826080 A    12/2012
(Continued)

OTHER PUBLICATIONS

WO document No. WO 2021218264 to Wang et al published on Apr. 11, 2021.*

(Continued)

*Primary Examiner* — Pamela Rodriguez
(74) *Attorney, Agent, or Firm* — Leydig, Voit & Mayer, Ltd.

(57) ABSTRACT

A brake system of a vehicle, a vehicle, and a control method for a brake system are provided. In the brake system, a first control valve is used to connect a first brake pipe and a second brake pipe, so that when the first control valve is in a connected state, the first brake pipe is connected to the second brake pipe, and brake fluid in the two brake pipes can flow in the two brake pipes, thereby helping improve redundancy performance of the brake system.

20 Claims, 15 Drawing Sheets

(51) Int. Cl.
   *B60T 8/171* (2006.01)
   *B60T 8/88* (2006.01)
   *B60T 13/68* (2006.01)

(52) U.S. Cl.
   CPC ......... *B60T 13/686* (2013.01); *B60T 2220/04* (2013.01); *B60T 2270/402* (2013.01); *B60T 2270/413* (2013.01); *B60T 2270/88* (2013.01)

(58) Field of Classification Search
   CPC ........... B60T 2270/402; B60T 2270/88; B60T 2220/04; B60T 7/042; B60T 8/17; B60T 13/142; B60T 13/745
   See application file for complete search history.

(56) References Cited

U.S. PATENT DOCUMENTS

| | | | |
|---|---|---|---|
| 2019/0039585 A1* | 2/2019 | Krautter | ............... B60T 13/662 |
| 2019/0176785 A1 | 6/2019 | Hansmann | |
| 2019/0344769 A1* | 11/2019 | Zimmermann | ......... B60T 8/326 |
| 2019/0375391 A1* | 12/2019 | Ernst | ....................... B60T 7/042 |
| 2023/0033528 A1* | 2/2023 | Yang | .................... B60T 13/662 |

FOREIGN PATENT DOCUMENTS

| | | |
|---|---|---|
| CN | 103492247 A | 1/2014 |
| CN | 203558059 U | 4/2014 |
| CN | 105764759 A | 7/2016 |
| CN | 106379302 A | 2/2017 |
| CN | 107107895 A | 8/2017 |
| CN | 208881775 U | 5/2019 |
| CN | 110177720 A | 8/2019 |
| DE | 102011122776 A1 | 1/2013 |
| WO | 2019091947 A1 | 5/2019 |

OTHER PUBLICATIONS

Office Action for Chinese Application No. 201910940787 dated Sep. 29, 2021, 14 pages.
PCT International Search Report for Application PCT/CN2020/113986 dated Sep. 30, 2019, 12 pages.

* cited by examiner

| 1310: A controller determines that a pressure providing apparatus on a target brake pipe is faulty |
|---|
| 1320: The controller controls a first control valve 130 to be in an on state, so that a first brake pipe 111 is connected to a second brake pipe 121 |

FIG. 14B

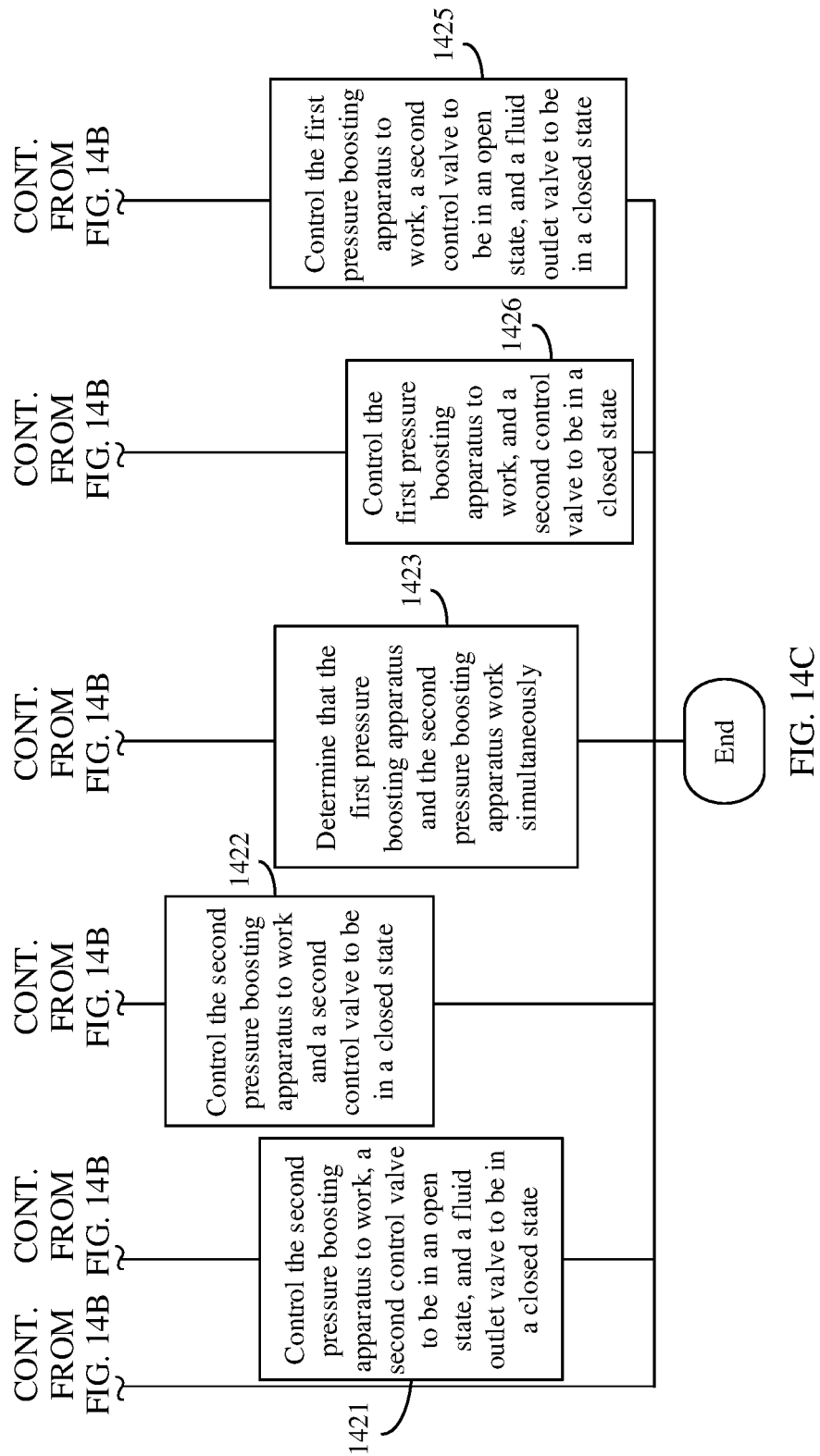

BRAKE SYSTEM OF VEHICLE, VEHICLE, AND CONTROL METHOD FOR BRAKE SYSTEM

CROSS-REFERENCE TO RELATED APPLICATIONS

This application is a continuation of International Application No. PCT/CN2020/113986, filed on Sep. 8, 2020, which claims priority to Chinese Patent Application No. 201910940787.2, filed on Sep. 30, 2019. The disclosures of the aforementioned applications are hereby incorporated by reference in their entireties.

TECHNICAL FIELD

This application relates to the vehicle field, and more specifically, to a brake system of a vehicle, a vehicle, and a control method for a brake system.

BACKGROUND

A brake system of a vehicle is a system that forcibly brakes the vehicle to some extent by applying specific brake force to wheels of the vehicle. The brake system is used to force a traveling vehicle to decelerate or even stop based on a requirement of a driver or a controller, or to enable a stopped vehicle to park stably under various road conditions (for example, on a rampway), or to enable a vehicle that goes downhill to keep a stable speed. With electrification and intelligentization development of vehicles, the vehicle has an increasingly high requirement for a brake system. For example, with improvement of an automated driving level, dependence of running of the brake system on a driver is reduced, and therefore a requirement for redundancy performance of the brake system is increasingly high, and the vehicle is required to still have a braking function even after one or more parts of the brake system fail.

To improve the redundancy performance of the brake system, as a popular brake system, an electro-hydraulic brake (EHB) system generally includes two levels of brake sub-systems. In a first-level brake system, a controller controls, in a wire-controlled manner, a hydraulic cylinder to provide brake force for a wheel, and in a second-level brake sub-system, a master brake cylinder provides brake force for a wheel.

In both the first-level brake sub-system and the second-level brake sub-system, the master brake cylinder and the hydraulic cylinder separately adjust brake force of four wheels of the vehicle by controlling pressure of brake fluid in two independent brake pipes. Specifically, pressure of brake fluid in a first brake pipe is controlled to adjust brake force of a first group of wheels, and pressure of brake fluid in a second brake pipe is controlled to adjust brake force of a second group of wheels. In this way, after one of the brake pipes is faulty, the vehicle may further control brake force of a corresponding wheel by using the other brake pipe, so that brake performance of the electro-hydraulic brake system does not entirely fail. However, in the foregoing electro-hydraulic brake system, after a pressure providing apparatus (a pressure boosting apparatus and a master brake cylinder) on one brake pipe fails, the vehicle loses half of the brake force, and a current requirement of automated driving for redundancy performance of the brake system cannot be met.

SUMMARY

This application provides a brake system of a vehicle, a vehicle, and a control method for a brake system, to improve redundancy performance of the brake system.

According to a first aspect, this application provides a brake system of a vehicle, and the brake system includes a first pressure boosting apparatus, a second pressure boosting apparatus, and a first control valve. The first pressure boosting apparatus is configured to adjust pressure of brake fluid in a first brake pipe, to control brake force applied to a first group of wheels of the vehicle. The second pressure boosting apparatus is configured to adjust pressure of brake fluid in a second brake pipe, to control brake force applied to a second group of wheels of the vehicle, where the first group of wheels are different from the second group of wheels. The first control valve is configured to connect the first brake pipe to the second brake pipe, where if the first control valve is in a connected state, the first brake pipe is connected to the second brake pipe, and if the first control valve is in an disconnected state, the first brake pipe is disconnected from the second brake pipe.

In this embodiment of this application, the first control valve is used to connect the first brake pipe and the second brake pipe, so that when the first control valve is in a connected state, the first brake pipe is connected to the second brake pipe, and brake fluid in the two brake pipes can flow in the two brake pipes, thereby helping improve redundancy performance of the brake system, and avoiding a problem in an existing brake system that the first brake pipe and the second brake pipe are two mutually independent brake pipes, and after a pressure providing apparatus (a pressure boosting apparatus and a master brake cylinder) on one brake pipe fails, the vehicle loses half of brake force.

In another aspect, after a pressure providing apparatus on a target brake pipe is faulty, a controller may control the first control valve to be in a connected state, so that the first brake pipe is connected to the second brake pipe, and pressure of brake fluid in the two brake pipes is balanced, to improve traveling stability.

In a possible implementation, if the first control valve is in a connected state, the first pressure boosting apparatus is configured to adjust the pressure of the brake fluid in the first brake pipe, to adjust the pressure of the brake fluid in the second brake pipe; and/or if the first control valve is in a connected state, the second pressure boosting apparatus is configured to adjust the pressure of the brake fluid in the second brake pipe, to adjust the pressure of the brake fluid in the first brake pipe.

In this embodiment of this application, if the first control valve is in a connected state, the first pressure boosting apparatus may boost the pressure of the brake fluid in the second brake pipe, to control the brake force applied to the second group of wheels. Accordingly, the second pressure boosting apparatus may also boost the pressure of the brake fluid in the first brake pipe, to control the brake force applied to the first group of wheels. In this way, redundancy performance of the brake system is improved.

In a possible implementation, the brake system further includes a tandem master brake cylinder. A first chamber of the master brake cylinder communicates with the first brake pipe, and is configured to adjust the pressure of the brake fluid in the first brake pipe, to control the brake force applied to the first group of wheels. A second chamber of the master brake cylinder communicates with the second brake pipe, and is configured to adjust the pressure of the brake fluid in the second brake pipe, to control the brake force applied to the second group of wheels.

In this embodiment of this application, if the first control valve is in a connected state, the first chamber may boost the pressure of the brake fluid in the second brake pipe, to control the brake force applied to the second group of wheels. Accordingly, the second pressure boosting apparatus may also boost the pressure of the brake fluid in the first brake pipe, to control the brake force applied to the first group of wheels. In this way, redundancy performance of the brake system is improved.

Optionally, if the first control valve is in a connected state, the master brake cylinder adjusts the pressure of the brake fluid in the first brake pipe by using the first chamber, to adjust the pressure of the brake fluid in the second brake pipe; and/or if the first control valve is in a connected state, the master brake cylinder adjusts the pressure of the brake fluid in the second brake pipe by using the second chamber, to adjust the pressure of the brake fluid in the first brake pipe.

In a possible implementation, the brake system further includes a fluid storage apparatus for storing brake fluid, a plurality of fluid outlet valves, and a second control valve. Pressure outlet ports of the plurality of fluid outlet valves are connected to a pressure inlet port of a fluid outlet pipe, a pressure outlet port of the fluid outlet pipe is connected to an inlet port of the fluid storage apparatus, and the second control valve is located on a fluid outlet pipe between the pressure inlet port of the fluid outlet pipe and the inlet port of the fluid storage apparatus.

In this embodiment of this application, the second control valve is disposed on the fluid outlet pipe between the pressure inlet port of the fluid outlet pipe and the inlet port of the fluid storage apparatus. When the second control valve is in an disconnected state, a fluid outlet pipe between the pressure inlet port of the fluid outlet pipe and the second control valve may be used as a brake pipe that provides brake force for a brake wheel cylinder, to improve redundancy performance of the brake system.

In a possible implementation, if the second control valve is in an disconnected state and the plurality of fluid outlet valves are in a connected state, a target pressure boosting apparatus is configured to adjust pressure of brake fluid in a first segment of pipe of the fluid outlet pipe, to control the brake force applied to the first group of wheels and/or the second group of wheels; and the target pressure boosting apparatus is the master brake cylinder, the first pressure boosting apparatus, or the second pressure boosting apparatus, and the first segment of pipe is a fluid outlet pipe between the pressure inlet port of the fluid outlet pipe and the second control valve.

In this embodiment of this application, if the second control valve is in an disconnected state and the plurality of fluid outlet valves are in a connected state, the target pressure boosting apparatus may adjust the pressure of the brake fluid in the first segment of pipe, to control the brake force applied to the first group of wheels and/or the second group of wheels, thereby helping improve redundancy performance of the brake system.

In a possible implementation, the brake system further includes a controller. The controller is configured to send first control information to the first pressure boosting apparatus, to control the brake force applied by the first pressure boosting apparatus to the first group of wheels; and/or the controller is further configured to send second control information to the second pressure boosting apparatus, to control the brake force applied by the second pressure boosting apparatus to the second group of wheels.

In this embodiment of this application, the controller may directly control the first pressure boosting apparatus and the second pressure boosting apparatus to respectively provide brake force for the first group of wheels and the second group of wheels, thereby helping improve diversity of a working mode of the brake system.

In a possible implementation, the brake system further includes a pressure sensor, and the pressure sensor is located on the first brake pipe between a pressure outlet port of the master brake cylinder and a pressure outlet port of the first pressure boosting apparatus; the pressure sensor is configured to detect the pressure that is of the brake fluid in the first brake pipe and that is adjusted by the master brake cylinder; and the pressure sensor is further configured to send pressure information indicating the pressure to the controller, so that the controller determines, based on the pressure, brake force applied to the wheel of the vehicle.

In this embodiment of this application, the controller may determine the pressure of the brake fluid in the first brake pipe based on the pressure sensor, to determine, based on the pressure, the brake force applied to the wheel of the vehicle, thereby helping improve diversity of a working mode of the brake system.

In a possible implementation, the brake system further includes a pedal travel sensor; the pedal travel sensor is configured to detect a pedal traveling distance of a brake pedal of the vehicle; and the pedal travel sensor is further configured to send traveling distance information indicating the pedal traveling distance to the controller, so that the controller determines, based on the traveling distance, the brake force applied to the wheel of the vehicle.

In this embodiment of this application, the controller may determine the pedal traveling distance of the brake pedal based on the pedal travel sensor, to determine, based on the pedal traveling distance, the brake force applied to the wheel of the vehicle, thereby helping improve diversity of a working mode of the brake system.

In another aspect, when the pedal travel sensor and the pressure sensor are applied to a same brake system, the controller may determine, based on either of the foregoing two types of information (the pedal traveling distance and the pressure of the brake fluid), the brake force applied to the wheel of the vehicle, thereby helping improve redundancy performance of the brake system.

According to a second aspect, a vehicle is provided and includes a first group of wheels, a second group of wheels, a first pressure boosting apparatus, a second pressure boosting apparatus, and a first control valve, where the first group of wheels are different from the second group of wheels. The first pressure boosting apparatus is configured to adjust pressure of brake fluid in a first brake pipe, to apply brake force to the first group of wheels. The second pressure boosting apparatus is configured to adjust pressure of brake fluid in a second brake pipe, to apply brake force to the second group of wheels, where the first group of wheels are different from the second group of wheels. The first control valve is configured to connect the first brake pipe to the second brake pipe, where if the first control valve is in a connected state, the first brake pipe is connected to the second brake pipe, and if the first control valve is in an disconnected state, the first brake pipe is disconnected from the second brake pipe.

In this embodiment of this application, the first control valve is used to connect the first brake pipe and the second brake pipe, so that when the first control valve is in a connected state, the first brake pipe is connected to the second brake pipe, and brake fluid in the two brake pipes can flow in the two brake pipes, thereby helping improve redundancy performance of the brake system, and avoiding a problem in an existing brake system that the first brake pipe and the second brake pipe are two mutually independent brake pipes, and after a pressure providing apparatus (a pressure boosting apparatus and a master brake cylinder) on one brake pipe fails, the vehicle loses half of brake force.

In another aspect, after a pressure providing apparatus on a target brake pipe is faulty, a controller may control the first control valve to be in a connected state, so that the first brake pipe is connected to the second brake pipe, and pressure of brake fluid in the two brake pipes is balanced, to improve traveling stability.

In a possible implementation, if the first control valve is in a connected state, the first pressure boosting apparatus is configured to adjust the pressure of the brake fluid in the first brake pipe, to adjust the pressure of the brake fluid in the second brake pipe; and/or if the first control valve is in a connected state, the second pressure boosting apparatus is configured to adjust the pressure of the brake fluid in the second brake pipe, to adjust the pressure of the brake fluid in the first brake pipe.

In this embodiment of this application, if the first control valve is in a connected state, the first pressure boosting apparatus may boost the pressure of the brake fluid in the second brake pipe, to control the brake force applied to the second group of wheels. Accordingly, the second pressure boosting apparatus may also boost the pressure of the brake fluid in the first brake pipe, to control the brake force applied to the first group of wheels. In this way, redundancy performance of the brake system is improved.

In a possible implementation, the vehicle further includes a tandem master brake cylinder. A first chamber of the master brake cylinder communicates with the first brake pipe, and is configured to adjust the pressure of the brake fluid in the first brake pipe, to control the brake force applied to the first group of wheels. A second chamber of the master brake cylinder communicates with the second brake pipe, and is configured to adjust the pressure of the brake fluid in the second brake pipe, to control the brake force applied to the second group of wheels.

In this embodiment of this application, if the first control valve is in a connected state, the first chamber may boost the pressure of the brake fluid in the second brake pipe, to control the brake force applied to the second group of wheels. Accordingly, the second pressure boosting apparatus may also boost the pressure of the brake fluid in the first brake pipe, to control the brake force applied to the first group of wheels. In this way, redundancy performance of the brake system is improved.

Optionally, if the first control valve is in a connected state, the master brake cylinder adjusts the pressure of the brake fluid in the first brake pipe by using the first chamber, to adjust the pressure of the brake fluid in the second brake pipe; and/or if the first control valve is in a connected state, the master brake cylinder adjusts the pressure of the brake fluid in the second brake pipe by using the second chamber, to adjust the pressure of the brake fluid in the first brake pipe.

In a possible implementation, the vehicle further includes a fluid storage apparatus for storing brake fluid, a plurality of fluid outlet valves, and a second control valve. Pressure outlet ports of the plurality of fluid outlet valves are connected to a pressure inlet port of a fluid outlet pipe, a pressure outlet port of the fluid outlet pipe is connected to an inlet port of the fluid storage apparatus, and the second control valve is located on a fluid outlet pipe between the pressure inlet port of the fluid outlet pipe and the inlet port of the fluid storage apparatus.

In this embodiment of this application, the second control valve is disposed on the fluid outlet pipe between the pressure inlet port of the fluid outlet pipe and the inlet port of the fluid storage apparatus. When the second control valve is in an disconnected state, a fluid outlet pipe between the pressure inlet port of the fluid outlet pipe and the second control valve may be used as a brake pipe that provides brake force for a brake wheel cylinder, to improve redundancy performance of the brake system.

In a possible implementation, if the second control valve is in an disconnected state and the plurality of fluid outlet valves are in a connected state, a target pressure boosting apparatus is configured to adjust pressure of brake fluid in a first segment of pipe of the fluid outlet pipe, to control the brake force applied to the first group of wheels and/or the second group of wheels; and the target pressure boosting apparatus is the master brake cylinder, the first pressure boosting apparatus, or the second pressure boosting apparatus, and the first segment of pipe is a fluid outlet pipe between the pressure inlet port of the fluid outlet pipe and the second control valve.

In this embodiment of this application, if the second control valve is in an disconnected state and the plurality of fluid outlet valves are in a connected state, the target pressure boosting apparatus may adjust the pressure of the brake fluid in the first segment of pipe, to control the brake force applied to the first group of wheels and/or the second group of wheels, thereby helping improve redundancy performance of the brake system.

In a possible implementation, the vehicle further includes a controller. The controller is configured to send first control information to the first pressure boosting apparatus, to control the brake force applied by the first pressure boosting apparatus to the first group of wheels; and/or the controller is further configured to send second control information to the second pressure boosting apparatus, to control the brake force applied by the second pressure boosting apparatus to the second group of wheels.

In this embodiment of this application, the controller may directly control the first pressure boosting apparatus and the second pressure boosting apparatus to respectively provide brake force for the first group of wheels and the second group of wheels, thereby helping improve diversity of a working mode of the brake system.

In a possible implementation, the vehicle further includes a pressure sensor, and the pressure sensor is located on the first brake pipe between a pressure outlet port of the master brake cylinder and a pressure outlet port of the first pressure boosting apparatus; the pressure sensor is configured to detect the pressure that is of the brake fluid in the first brake pipe and that is adjusted by the master brake cylinder; and the pressure sensor is further configured to send pressure information indicating the pressure to the controller, so that the controller determines, based on the pressure, brake force applied to the wheel of the vehicle.

In this embodiment of this application, the controller may determine the pressure of the brake fluid in the first brake pipe based on the pressure sensor, to determine, based on the pressure, the brake force applied to the wheel of the vehicle, thereby helping improve diversity of a working mode of the brake system.

In a possible implementation, the vehicle further includes a pedal travel sensor; the pedal travel sensor is configured to detect a pedal traveling distance of a brake pedal of the vehicle; and the pedal travel sensor is further configured to send traveling distance information indicating the pedal traveling distance to the controller, so that the controller determines, based on the traveling distance, the brake force applied to the wheel of the vehicle.

In a possible implementation, the first group of wheels include a right front wheel and a left front wheel, and the second group of wheels include a right rear wheel and a left rear wheel; or the first group of wheels include a right front wheel and a left rear wheel, and the second group of wheels include a left front wheel and a left rear wheel.

In this embodiment of this application, the controller may determine the pedal traveling distance of the brake pedal based on the pedal travel sensor, to determine, based on the pedal traveling distance, the brake force applied to the wheel of the vehicle, thereby helping improve diversity of a working mode of the brake system.

In another aspect, when the pedal travel sensor and the pressure sensor are applied to a same brake system, the controller may determine, based on either of the foregoing two types of information (the pedal traveling distance and the pressure of the brake fluid), the brake force applied to the wheel of the vehicle, thereby helping improve redundancy performance of the brake system.

According to a third aspect, this application provides a control method for a brake system, and the brake system includes a first pressure boosting apparatus, a second pressure boosting apparatus, and a first control valve. The first pressure boosting apparatus is configured to adjust pressure of brake fluid in a first brake pipe, to control brake force applied to a first group of wheels of a vehicle. The second pressure boosting apparatus is configured to adjust pressure of brake fluid in a second brake pipe, to control brake force applied to a second group of wheels of the vehicle, where the first group of wheels are different from the second group of wheels. The first control valve is configured to connect the first brake pipe to the second brake pipe, and if the first control valve is in an disconnected state, the first brake pipe is disconnected from the second brake pipe. The method includes: If the controller controls the first control valve to be in a connected state, the first brake pipe is connected to the second brake pipe; and if the controller controls the first control valve to be in an disconnected state, the first brake pipe is disconnected from the second brake pipe.

In this embodiment of this application, after a pressure providing apparatus on a target brake pipe is faulty, the controller may control the first control valve to be in a connected state, so that the first brake pipe is connected to the second brake pipe, and the brake fluid may flow in the two brake pipes, thereby helping improve redundancy performance of the brake system, and avoiding a problem in an existing brake system that the first brake pipe and the second brake pipe are two mutually independent brake pipes, and after a pressure providing apparatus (a pressure boosting apparatus and a master brake cylinder) on one brake pipe fails, the vehicle loses half of brake force.

In a possible implementation, the method includes: The controller determines that a pressure providing apparatus on the target brake pipe is faulty, where the target brake pipe is the first brake pipe or the second brake pipe; and the controller controls the first control valve to be in a connected state, so that the first brake pipe is connected to the second brake pipe.

In this embodiment of this application, after the pressure providing apparatus on the target brake pipe is faulty, the controller may control the first control valve to be in a connected state, so that the first brake pipe is connected to the second brake pipe, and pressure of brake fluid in the two brake pipes is balanced, to improve traveling stability.

In a possible implementation, the target brake pipe is the first brake pipe, the pressure providing apparatus includes the first pressure boosting apparatus, and the method further includes: The controller controls the second pressure boosting apparatus to adjust the pressure of the brake fluid in the second brake pipe, to adjust the pressure of the brake fluid in the first brake pipe.

In this embodiment of this application, after the first pressure boosting apparatus on the first brake pipe is faulty, the controller may control the first control valve to be in a connected state, so that the first brake pipe is connected to the second brake pipe, and the brake fluid may flow in the two brake pipes, thereby helping improve redundancy performance of the brake system.

In a possible implementation, the target brake pipe is the second brake pipe, the pressure providing apparatus includes the second pressure boosting apparatus, and the method further includes: The controller controls the first pressure boosting apparatus to adjust the pressure of the brake fluid in the first brake pipe, to adjust the pressure of the brake fluid in the second brake pipe.

In this embodiment of this application, after the second pressure boosting apparatus on the second brake pipe is faulty, the controller may control the first control valve to be in a connected state, so that the first brake pipe is connected to the second brake pipe, and the brake fluid may flow in the two brake pipes, thereby helping improve redundancy performance of the brake system.

In a possible implementation, the brake system further includes a tandem master brake cylinder. A first chamber of the master brake cylinder communicates with the first brake pipe, and is configured to adjust the pressure of the brake fluid in the first brake pipe, to control the brake force applied to the first group of wheels. A second chamber of the master brake cylinder communicates with the second brake pipe, and is configured to adjust the pressure of the brake fluid in the second brake pipe, to control the brake force applied to the second group of wheels. The method further includes: If the first chamber is faulty, the controller controls the first control valve to be in a connected state, so that the pressure of the brake fluid in the second brake pipe and the pressure of the brake fluid in the first brake pipe are balanced; or if the second chamber is faulty, the controller controls the first control valve to be in a connected state, so that the pressure of the brake fluid in the first brake pipe and the pressure of the brake fluid in the second brake pipe are balanced.

In this embodiment of this application, after the first chamber is faulty, the controller may control the first control valve to be in a connected state, so that the first brake pipe is connected to the second brake pipe, and the brake fluid may flow in the two brake pipes, thereby helping improve redundancy performance of the brake system.

After the second chamber is faulty, the controller may control the first control valve to be in a connected state, so that the first brake pipe is connected to the second brake pipe, and the brake fluid may flow in the two brake pipes, thereby helping improve redundancy performance of the brake system.

In a possible implementation, the brake system further includes a fluid storage apparatus for storing brake fluid, a plurality of fluid outlet valves, and a second control valve. Pressure outlet ports of the plurality of fluid outlet valves are connected to a pressure inlet port of a fluid outlet pipe, a pressure outlet port of the fluid outlet pipe is connected to an inlet port of the fluid storage apparatus, and the second control valve is located on a fluid outlet pipe between the pressure inlet port of the fluid outlet pipe and the inlet port of the fluid storage apparatus. The method further includes: The controller determines that the first pressure boosting apparatus and the first control valve are faulty; and the controller controls the second control valve to be in an disconnected state, and controls the plurality of fluid outlet valves to be in a connected state, so that brake fluid in a first segment of pipe is pressed into a brake wheel cylinder of a wheel of the vehicle by the second pressure boosting apparatus, to control brake force applied to the wheel of the vehicle, where the first segment of pipe is a pipe between the pressure inlet port of the fluid outlet pipe and the second control valve.

In this embodiment of this application, when the first pressure boosting apparatus and the first control valve are faulty, the controller may control the second control valve to be in an disconnected state, and control the plurality of fluid outlet valves to be in a connected state, so that the brake fluid in the first segment of pipe is pressed into a brake wheel cylinder of the vehicle by the second pressure boosting apparatus; in other words, the first segment of pipe is used as a brake pipe that provides brake force for the brake wheel cylinder, to improve redundancy performance of the brake system.

In a possible implementation, the method further includes: The controller determines that the second pressure boosting apparatus and the first control valve are faulty; and the controller controls the second control valve to be in an disconnected state, and controls the plurality of fluid outlet valves to be in a connected state, so that brake fluid in the first segment of pipe is pressed into the brake wheel cylinder of the wheel of the vehicle by the first pressure boosting apparatus, to control the brake force applied to the wheel of the vehicle.

In this embodiment of this application, when the second pressure boosting apparatus and the first control valve are faulty, the controller may control the second control valve to be in an disconnected state, and control the plurality of fluid outlet valves to be in a connected state, so that the brake fluid in the first segment of pipe is pressed into the brake wheel cylinder of the vehicle by the first pressure boosting apparatus; in other words, the first segment of pipe is used as a brake pipe that provides brake force for the brake wheel cylinder, to improve redundancy performance of the brake system.

In a possible implementation, the brake system further includes a pressure sensor and a pedal travel sensor. The pressure sensor is configured to detect the pressure that is of the brake fluid in the first brake pipe and that is adjusted by the master brake cylinder. The pedal travel sensor is configured to detect a pedal traveling distance of a brake pedal of the vehicle. The method further includes: The controller receives pressure information that is sent by the pressure sensor and that is used to indicate the pressure; and if the pedal travel sensor fails, the controller allocates brake force to the first group of wheels and/or the second group of wheels based on the pedal traveling distance.

In this embodiment of this application, when the pedal travel sensor and the pressure sensor are applied to a same brake system, the controller may determine, based on either of the foregoing two types of information (the pedal traveling distance and the pressure of the brake fluid), the brake force applied to the wheel of the vehicle, thereby helping improve redundancy performance of the brake system.

According to a fourth aspect, a controller is provided, and the controller may be an independent device, or may be a chip in the device. The controller may include a processing unit and a sending unit. When the controller is an independent device, the processing unit may be a processor, and the sending unit may be an input/output interface; the device may further include a storage unit, and the storage unit may be a memory; and the storage unit is configured to store instructions, and the processing unit executes the instructions stored in the storage unit, so that the device is enabled to perform the method in the third aspect. When the controller is a chip in a device, the processing unit may be a processor, and the sending unit may be a pin, a circuit, or the like; and the processing unit executes instructions stored in the storage unit, so that the controller performs the method in the third aspect. The storage unit may be a storage unit (for example, a register or a cache) in the chip, or may be a storage unit (for example, a read-only memory or a random access memory) that is in a terminal device/network device and that is outside the chip.

In the fourth aspect, that a memory is coupled to a processor may be understood as that the memory is located in the processor, or the memory is located outside the processor, so that the memory is independent of the processor.

According to a fifth aspect, a computer program product is provided. The computer program product includes computer program code, and when the computer program code is run on a computer, the computer is enabled to perform the methods in the foregoing aspects.

It should be noted that some or all of the computer program code can be stored in a first storage medium. The first storage medium can be encapsulated with a processor, or encapsulated separately from a processor. This is not specifically limited in this embodiment of this application.

According to a sixth aspect, a computer-readable medium is provided. The computer-readable medium stores program code. When the computer program code is run on a computer, the computer is enabled to perform the methods in the foregoing aspects.

BRIEF DESCRIPTION OF THE DRAWINGS

FIG. 14A, FIG. 14B, and FIG. 14C are a flowchart of a control method for a brake system according to another embodiment of this application.

DETAILED DESCRIPTION OF ILLUSTRATIVE EMBODIMENTS

Figure 1:
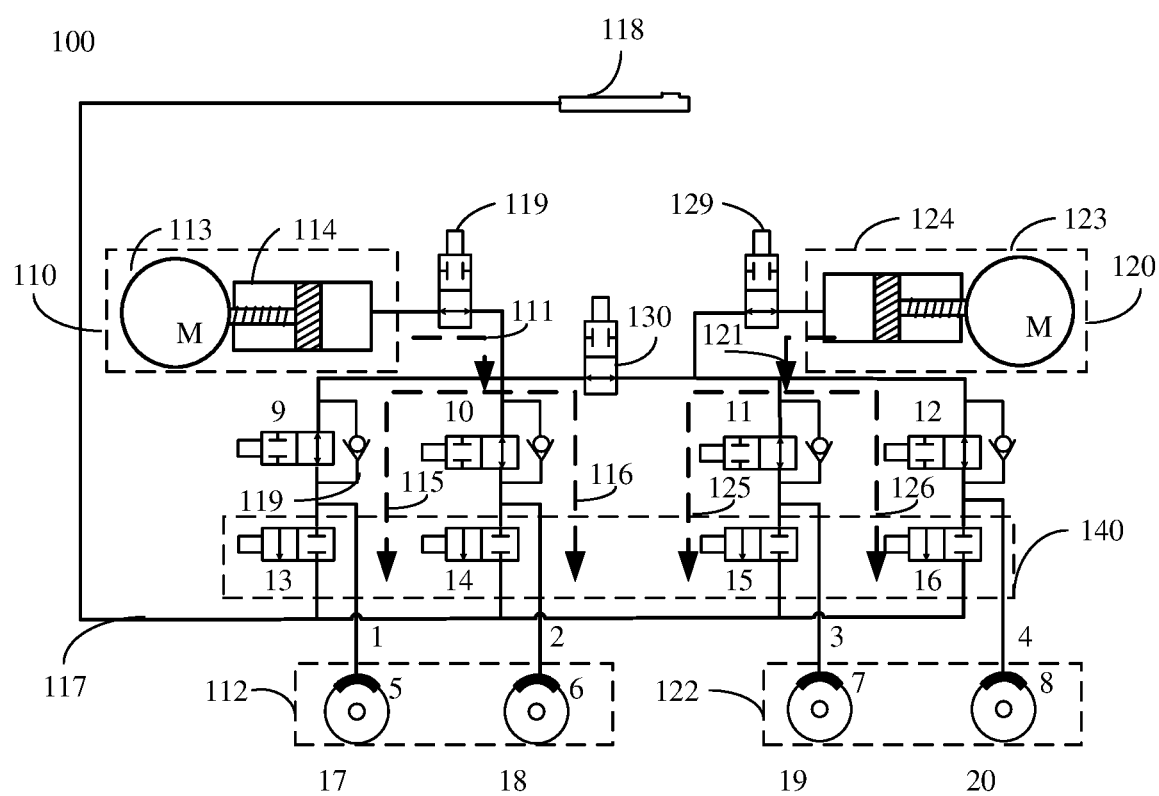
FIG. 1 is a schematic diagram of a first-level brake sub-system 100 according to an embodiment of this application.

The following describes the technical solutions of this application with reference to accompanying drawings.

In an existing brake system, as a popular brake system, an EHB usually includes two levels of brake sub-systems. In a first-level brake system, a controller controls, in a wire-controlled manner, a pressure boosting apparatus to provide brake force for a wheel, and in a second-level brake sub-system, a master brake cylinder provides brake force for a wheel.

In both the first-level brake sub-system and the second-level brake sub-system, the master brake cylinder and a hydraulic cylinder separately adjust brake force of four wheels of a vehicle by controlling pressure of brake fluid in two independent brake pipes. Specifically, pressure of brake fluid in a first brake pipe is controlled to adjust brake force applied to a first group of wheels, and pressure of brake fluid in a second brake pipe is controlled to adjust brake force of a second group of wheels. In this way, after one of the brake pipes is faulty, the vehicle may further control brake force of a corresponding wheel by using the other brake pipe, so that brake performance of an electro-hydraulic brake system does not entirely fail. However, in the foregoing electro-hydraulic brake system, after a pressure providing apparatus (a pressure boosting apparatus and the master brake cylinder) on one brake pipe fails, the vehicle loses half of the brake force, and a current requirement of automated driving for redundancy performance of the brake system cannot be met.

To improve redundancy performance of a brake system, an embodiment of this application provides a new brake system. To be specific, a first brake pipe 111 and a second brake pipe 121 are connected by using a first control valve 130. Therefore, the first control valve 130 is also referred to as a "connection valve". When a pressure boosting apparatus on one of the two brake pipes (11 and 121) is faulty, the first control valve 130 may be controlled to be in a connected state, so that brake fluid in the two brake pipes can flow in the two brake pipes, or pressure of the brake fluid in the two brake pipes is balanced. In this case, the pressure boosting apparatus may adjust, by using the two connected brake pipes, brake force applied to a wheel of a vehicle. A brake system according to an embodiment of this application is described below with reference to FIG. 1.

It should be noted that, for ease of describing a connection relationship between brake elements in the brake system, terms such as "pressure outlet port" and "pressure inlet port" are used. The "pressure outlet port" may be understood as a port through which brake fluid flows out, and the "pressure inlet port" may be understood as a port through which brake fluid flows in. To be specific, the "pressure outlet port" and the "pressure inlet port" may be understood as functions for limiting ports functionally. The "pressure outlet port" and the "pressure inlet port" may be used to limit a function of a physical port in different working modes. The "pressure outlet port" and the "pressure inlet port" may alternatively correspond to two different physical ports. This is not limited in this embodiment of this application.

Generally, in the following descriptions, when a pressure inlet port of a device A and a pressure outlet port of a device B are connected, it may be understood that the pressure inlet port and the pressure outlet port correspond to two physical ports, and are used to describe a connection relationship between the device A and the device B.

FIG. 1 is a schematic diagram of a first-level brake sub-system 100 according to an embodiment of this application. The first-level brake sub-system 100 shown in FIG. 1 includes a first pressure boosting apparatus 110, a second pressure boosting apparatus 120, and a first control valve 130.

The first pressure boosting apparatus 110 is configured to adjust pressure of brake fluid in a first brake pipe 111, to control brake force applied to a first group of wheels 112 of a vehicle.

A pressure outlet port of the first pressure boosting apparatus 110 is connected to a pressure inlet port of the first brake pipe 111, the first brake pipe 111 includes two pressure outlet ports (1 and 2), and the two pressure outlet ports (1 and 2) are connected to pressure inlet ports (5 and 6) of brake wheel cylinders of the first group of wheels 112.

Accordingly, the first pressure boosting apparatus 110 may be configured to boost the pressure of the brake fluid in the first brake pipe 111, to increase the brake force applied to the first group of wheels 112 of the vehicle.

Optionally, the first pressure boosting apparatus 110 includes a motor 113 and a hydraulic cylinder 114. The motor 113 is configured to drive a piston in the hydraulic cylinder 114 to perform linear reciprocating motion, and press brake fluid in the hydraulic cylinder 114 into the first brake pipe 111, to boost the pressure of the brake fluid in the first brake pipe 111.

The second pressure boosting apparatus 120 is configured to adjust pressure of brake fluid in a second brake pipe 121, to control brake force applied to a second group of wheels 122 of the vehicle.

A pressure outlet port of the first pressure boosting apparatus 120 is connected to a pressure inlet port of the second brake pipe 121, the second brake pipe 121 includes two pressure outlet ports (3 and 4), and the two pressure outlet ports (3 and 4) are connected to pressure inlet ports (7 and 8) of brake wheel cylinders of the second group of wheels 122.

Accordingly, the second pressure boosting apparatus 120 may be configured to boost the pressure of the brake fluid in the second brake pipe 121, to increase the brake force applied to the second group of wheels 122 of the vehicle.

Optionally, the second pressure boosting apparatus 120 includes a motor 123 and a hydraulic cylinder 124. The motor 123 is configured to drive a piston in the hydraulic cylinder 124 to perform linear reciprocating motion, and press brake fluid in the hydraulic cylinder 114 into the second brake pipe 121, to boost the pressure of the brake fluid in the second brake pipe 121.

The first group of wheels are different from the second group of wheels. The first group of wheels include a right front wheel and a left front wheel, and the second group of wheels include a right rear wheel and a left rear wheel; in other words, the first-level brake sub-system 100 is disposed in an H-shape. Alternatively, the first group of wheels include a right front wheel and a left rear wheel, and the second group of wheels include a left front wheel and a left rear wheel; in other words, the first-level brake sub-system 100 is arranged in an X-shape. This is not limited in this embodiment of this application.

The first control valve 130 is configured to connect the first brake pipe 111 to the second brake pipe 121. If the first control valve 130 is in a connected state, the first brake pipe 111 is connected to the second brake pipe 121, and if the first control valve 111 is in an disconnected state, the first brake pipe 111 is disconnected from the second brake pipe 121.

If the first control valve 130 is in an disconnected state, the first brake pipe 111 and the second brake pipe 121 are independent brake pipes, and pressure of the brake fluid in the two brake pipes is respectively controlled by the first pressure boosting apparatus 110 and the second pressure boosting apparatus 120. If the first control valve 130 is in a connected state, the first brake pipe 111 and the second brake pipe 121 are connected brake pipes, and the brake fluid may flow between the first brake pipe 111 and the second brake pipe 121, so that the pressure of the brake fluid in the two brake pipes is balanced.

Optionally, if the first control valve 130 is in a connected state, the first pressure boosting apparatus 110 is configured to adjust the pressure of the brake fluid in the first brake pipe 111, to adjust the pressure of the brake fluid in the second brake pipe 121. If the first control valve 130 is in a connected state, the second pressure boosting apparatus 120 is configured to adjust the pressure of the brake fluid in the second brake pipe 121, to adjust the pressure of the brake fluid in the first brake pipe 111.

In this way, based on the foregoing brake system described in this application, when the first pressure boosting apparatus 110 is faulty, but brake force needs to be applied to the first group of wheels 112, the first control valve 130 may be controlled to be in a connected state. In this case, the second pressure boosting apparatus 120 may boost the pressure of the brake fluid in the second brake pipe 121 to transfer the pressure of the brake fluid in the second brake pipe 121 to the first brake pipe 111 and finally apply the brake force to the first group of wheels 112 by boosting the pressure of the brake fluid in the first brake pipe 111.

When the second pressure boosting apparatus 120 is faulty, but brake force needs to be applied to the second group of wheels 122, the first control valve 130 may be controlled to be in a connected state. In this case, the first pressure boosting apparatus 110 may boost the pressure of the brake fluid in the first brake pipe 111 to transfer the pressure of the brake fluid in the first brake pipe 111 to the second brake pipe 121 and finally apply the brake force to the second group of wheels 122 by boosting the pressure of the brake fluid in the second brake pipe 121.

Generally, when the first pressure boosting apparatus 110 is faulty, to avoid a case in which the first pressure boosting apparatus 110 intermittently boosts pressure of a brake system, a control valve 119 may be disposed at a pressure outlet port of the first pressure boosting apparatus 110. After the first pressure boosting apparatus 110 is faulty, the control valve 119 may be controlled to be in an disconnected state, and in this case, the first pressure boosting apparatus 110 is disconnected from the first brake pipe 11. Accordingly, a control valve 129 may also be disposed at a pressure outlet port of the second pressure boosting apparatus 120. After the second pressure boosting apparatus 120 is faulty, the control valve 129 may be controlled to be in an disconnected state, and in this case, the second pressure boosting apparatus 120 is disconnected from the second brake pipe 121. Therefore, the control valve 119 and the control valve 129 are also referred to as "isolation valves".

For the brake system, different brake force usually needs to be applied to different wheels. Therefore, fluid inlet valves (9, 10, 11, and 12) may be controlled to be configured on brake pipes corresponding to brake force of the wheels, to independently manage brake force applied to each wheel.

To be specific, a fluid inlet valve corresponding to a wheel to which brake force needs to be applied is controlled to be in a connected state, and a fluid inlet valve corresponding to another wheel to which brake force does not need to be applied is controlled to be in an disconnected state. When the fluid inlet valve is in a connected state, the brake fluid in the brake pipe can flow to a brake wheel cylinder of the wheel through a corresponding brake pipe. When the fluid inlet valve is in an disconnected state, the brake fluid in the brake pipe cannot flow to the brake wheel cylinder of the wheel through the corresponding brake pipe.

For example, as shown in FIG. 1, the first brake pipe in may include a first branch 115 and a second branch 116, to respectively control brake force on two wheels in the first group of wheels 112. A pressure outlet port of the first branch 115 is connected to a pressure inlet port 5 of a brake wheel cylinder 17 of the first group of wheels 112, and a pressure outlet port of the second branch 116 is connected to a pressure inlet port 6 of a brake wheel cylinder 18 of the first group of wheels 112. A fluid inlet valve 9 is disposed between a pressure inlet port of the first branch 115 and the pressure inlet port 5 of the brake wheel cylinder 17. When the fluid inlet valve 9 is in a connected state, pressure of brake fluid in the first branch 115 may be boosted, to increase brake force applied to the brake wheel cylinder 17. A fluid inlet valve 10 is disposed between a pressure inlet port of the second branch 116 and the pressure inlet port 6 of the brake wheel cylinder 18. When the fluid inlet valve 10 is in a connected state, pressure of brake fluid in the second branch 116 may be boosted, to increase brake force applied to the brake wheel cylinder 18.

It should be noted that the pressure inlet port of the first branch 115 and the pressure inlet port of the second branch 116 may be the pressure inlet port of the first brake pipe 11.

The second brake pipe 121 may include a first branch 125 and a second branch 126, to respectively control brake force on two wheels in the second group of wheels 122. A pressure outlet port of the first branch 125 is connected to a pressure inlet port 7 of a brake wheel cylinder 19 of the first group of wheels 122, and a pressure outlet port of the second branch 126 is connected to a pressure inlet port 8 of a brake wheel cylinder 20 of the first group of wheels 122. A fluid inlet valve 11 is disposed between a pressure inlet port of the first branch 125 and the pressure inlet port 7 of the brake wheel cylinder 19. When the fluid inlet valve 11 is in a connected state, pressure of brake fluid in the first branch 125 may be boosted, to increase brake force applied to the brake wheel cylinder 19. A fluid inlet valve 12 is disposed between the pressure outlet port of the second branch 126 and the pressure inlet port 8 of the brake wheel cylinder 20. When the fluid inlet valve 12 is in a connected state, pressure of brake fluid in the second branch 126 may be boosted, to increase brake force applied to the brake wheel cylinder 20.

It should be noted that the pressure inlet port of the first branch 125 and the pressure inlet port of the second branch 126 may be the pressure inlet port of the second brake pipe 121.

For the brake system, in some cases, the brake force on the wheel also needs to be decreased. Therefore, a fluid outlet valve (140) may be controlled to be configured on a brake pipe of each wheel to independently manage decreased brake force on each wheel. To be specific, a fluid outlet valve corresponding to a wheel on which brake force needs to be decreased is controlled to be in a connected state, and a fluid outlet valve corresponding to another wheel on which brake force does not need to be decreased is controlled to be in an disconnected state. When the fluid outlet valve is in a connected state, brake fluid in the brake pipe may flow to a fluid outlet pipe 117 through the fluid outlet valve, and flow to a fluid storage apparatus 118 through the fluid outlet pipe 117, to facilitate cycling. When the fluid outlet valve is in an disconnected state, the brake fluid in the brake pipe is blocked by the fluid outlet valve, and cannot flow to the fluid storage apparatus.

For example, as shown in FIG. 1, the first brake pipe 11 may include a first branch 115 and a second branch 116, to respectively control brake force on two wheels in the first group of wheels 112. A pressure outlet port of the first branch 115 is connected to a pressure inlet port 5 of a brake wheel cylinder 17 of the first group of wheels 112, and a pressure outlet port of the second branch 116 is connected to a pressure inlet port 6 of a brake wheel cylinder 18 of the first group of wheels 112. A fluid outlet valve 13 is disposed between a pressure inlet port of the first branch 115 and the pressure inlet port 5 of the brake wheel cylinder 17. When the fluid outlet valve 13 is in a connected state, brake fluid in the first branch 115 may flow to the fluid outlet pipe 117 through the fluid outlet valve 13, and finally flow to the fluid storage apparatus 118, to avoid boosting pressure of the brake wheel cylinder 17 by using the brake fluid. When the fluid outlet valve 13 is in an disconnected state, the brake fluid in the first branch 115 is blocked by the fluid outlet valve 13, and cannot flow to the fluid outlet pipe 117. A fluid outlet valve 14 is disposed between a pressure inlet port 2 of the second branch 116 and the pressure inlet port 6 of the brake wheel cylinder 18. When the fluid outlet valve 14 is in a connected state, brake fluid in the second branch 116 may flow to the fluid outlet pipe 117 through the fluid outlet valve 14, and finally flow to the fluid storage apparatus 118, to avoid boosting pressure of the brake wheel cylinder 18 by using the brake fluid. When the fluid outlet valve 14 is in an disconnected state, the brake fluid in the first branch 116 is blocked by the fluid outlet valve 14, and cannot flow to the fluid outlet pipe 117.

It should be noted that the pressure inlet port of the first branch 115 and the pressure inlet port of the second branch 116 may be the pressure inlet port of the first brake pipe 11.

The second brake pipe 121 may include a first branch 125 and a second branch 126, to respectively control brake force on two wheels in the second group of wheels 122. A pressure outlet port of the first branch 125 is connected to a pressure inlet port 7 of a brake wheel cylinder 19 of the first group of wheels 122, and a pressure outlet port of the second branch 126 is connected to a pressure inlet port 8 of a brake wheel cylinder 20 of the first group of wheels 122. A fluid outlet valve 15 is disposed between a pressure inlet port of the first branch 125 and the pressure inlet port 7 of the brake wheel cylinder 19. When the fluid outlet valve 15 is in a connected state, brake fluid in the first branch 125 may flow to the fluid outlet pipe 117 through the fluid outlet valve 15, and finally flow to the fluid storage apparatus 118, to avoid boosting pressure of the brake wheel cylinder 19 by using the brake fluid. When the fluid outlet valve 15 is in an disconnected state, the brake fluid in the first branch 125 is blocked by the fluid outlet valve 15, and cannot flow to the fluid outlet pipe 117. A fluid outlet valve 16 is disposed between a pressure inlet port 2 of the second branch 116 and the pressure inlet port 8 of the brake wheel cylinder 20. When the fluid outlet valve 16 is in a connected state, brake fluid in the second branch 126 may flow to the fluid outlet pipe 117 through the fluid outlet valve 16, and finally flow to the fluid storage apparatus 118, to avoid boosting pressure of the brake wheel cylinder 20 by using the brake fluid. When the fluid outlet valve 16 is in an disconnected state, the brake fluid in the second branch 126 is blocked by the fluid outlet valve 16, and cannot flow to the fluid outlet pipe 117.

It should be noted that the pressure inlet port of the first branch 125 and the pressure inlet port of the second branch 126 may be the pressure inlet port of the second brake pipe 121.

The foregoing solution of the fluid outlet valve and the solution of the fluid inlet valve may be separately configured in the brake system for use, or may be used in a same brake system in cooperation with each other. With reference to FIG. 1, a connection manner between the fluid outlet valve 13 and the fluid inlet valve 9 corresponding to the brake wheel cylinder 17 is used as an example below to describe the connection manner between the fluid outlet valve 13 and the fluid inlet valve 9 in this embodiment of this application. It should be noted that a connection manner of the fluid outlet valve 14 and the fluid inlet valve 10 corresponding to the brake wheel cylinder 18, a connection manner of the fluid outlet valve 15 and the fluid inlet valve 11 corresponding to the brake wheel cylinder 19, and a connection manner of the fluid outlet valve 16 and the fluid inlet valve 12 corresponding to the brake wheel cylinder 20 may use a same connection manner.

The fluid inlet valve 9 is located on the first branch 115 of the first brake pipe 11, and is located between the pressure inlet port of the first branch 115 and the pressure inlet port 5 of the brake wheel cylinder 17. A pressure outlet port of the fluid inlet valve 9 is connected to a pressure inlet port of the fluid outlet valve 13, and a pressure outlet port of the inlet valve 9 is further connected to the pressure inlet port 5 of the brake wheel cylinder 17. A pressure outlet port of the fluid outlet valve 13 is connected to the fluid outlet pipe 117. Generally, to prevent brake fluid from flowing from the brake wheel cylinder 17 to the first pressure boosting apparatus, in other words, to prevent the brake fluid from being refluxed, a one-way valve 119 may be connected in parallel to two ends (the pressure outlet port and the pressure inlet port) of the fluid inlet valve 9.

It should be noted that the fluid inlet valve and the fluid outlet valve may cooperate with each other in a plurality of manners, and only one of the manners is listed above. For example, the first branch 115 may be further divided into two independent branches that are connected in parallel, and the fluid inlet valve and the fluid outlet valve are respectively disposed on the two independent branches. This is not limited in this embodiment of this application.

To improve redundancy performance of the brake system, the brake system may further include a second-level brake sub-system 200. It should be noted that the second-level brake sub-system 200 may be used in combination with the first-level brake sub-system 100, may be separately used as an independent brake system, or may be separately combined with another form of brake sub-system. This is not specifically limited in this embodiment of this application. A second-level brake sub-system according to an embodiment of this application is first described below with reference to FIG. 2, and then a brake system in which a first brake sub-system 100 cooperates with a second brake sub-system 200 is described with reference to FIG. 3.

Figure 2:
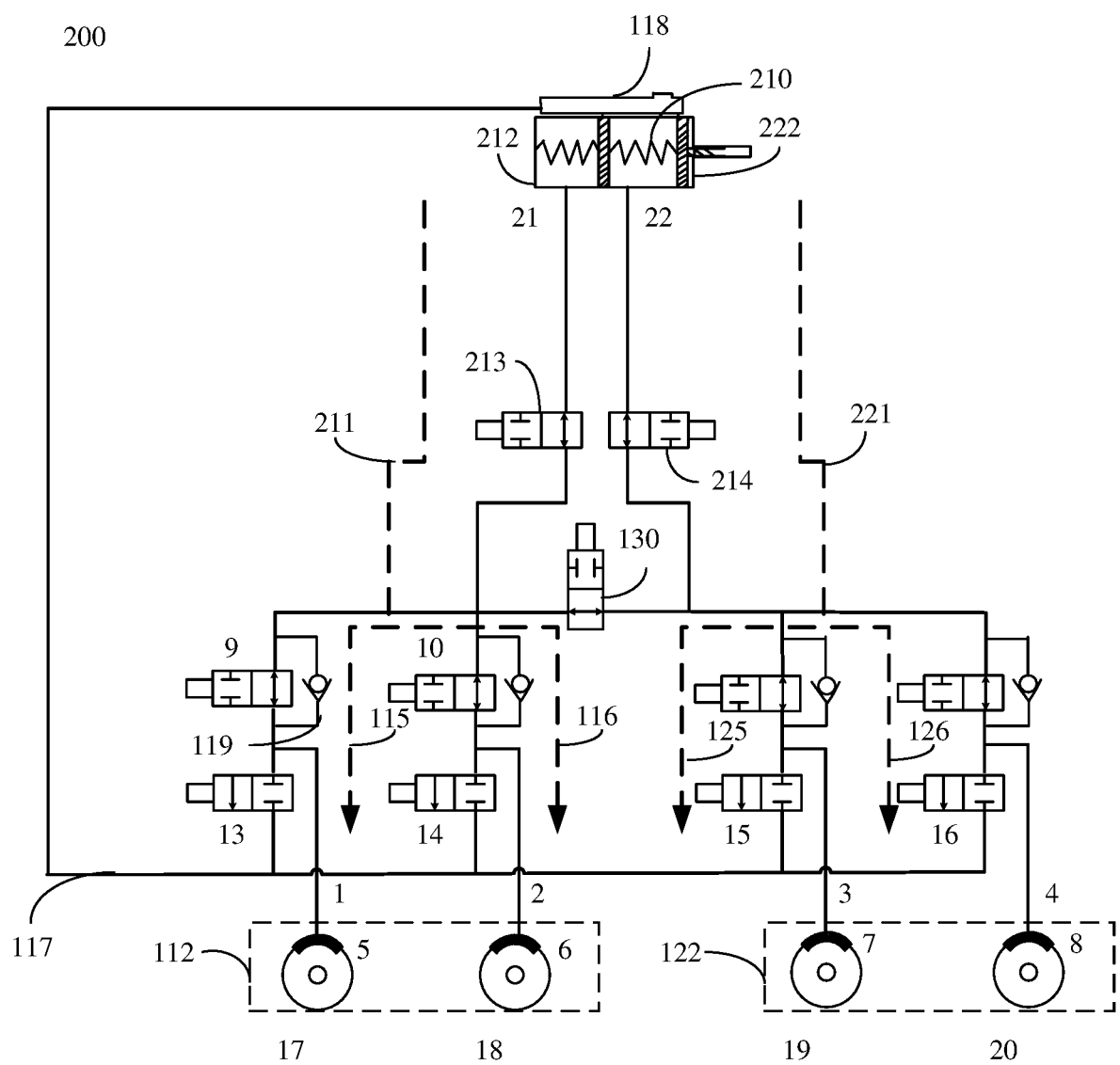
FIG. 2 is a schematic diagram of a second-level brake sub-system 200 according to an embodiment of this application.

FIG. 2 is a schematic diagram of a second-level brake sub-system 200 according to an embodiment of this application. The second-level brake sub-system 200 shown in FIG. 2 includes a master brake cylinder 210. The master brake cylinder 210 is configured to convert mechanical energy of a brake pedal into brake fluid pressure, and transmit the brake fluid pressure to a brake wheel cylinder through a brake pipe. It should be understood that parts in FIG. 2 with a same function as those in FIG. 1 use a same number. For brevity, for a specific function, refer to the foregoing descriptions. Details are not described herein again.

The master brake cylinder 210 is configured to adjust pressure of brake fluid in a first brake pipe 211, to control brake force applied to a first group of wheels 112.

The master brake cylinder 210 may be a tandem master brake cylinder. To be specific, a front chamber may be connected to a second brake pipe 221, and a rear chamber may be connected to the first brake pipe 211. Certainly, the master brake cylinder 210 may alternatively have a single chamber. In this case, the two brake pipes 211 and 221 are one physical pipe. A specific form of the master brake cylinder 210 is not limited in this embodiment of this application.

A first pressure outlet port of the master brake cylinder 210 is connected to a pressure inlet port of the first brake pipe 211, and the pressure of the brake fluid in the first brake pipe 211 may be boosted, to increase the brake force applied to the first group of wheels 112.

Pressure outlet ports (1 and 2) of the first brake pipe 211 are connected to pressure inlet ports (5 and 6) of brake wheel cylinders of the first group of wheels.

The master brake cylinder 210 is further configured to adjust pressure of brake fluid in the second brake pipe 221, to control brake force applied to a second group of wheels 122.

A second pressure outlet port of the master brake cylinder 210 is connected to a pressure inlet port of the second brake pipe 221, and the pressure of the brake fluid in the second brake pipe 211 may be boosted, to increase the brake force applied to the second group of wheels 122.

The first pressure outlet port and the second pressure outlet port may be a same pressure outlet port, or may be two different pressure outlet ports. This is not limited in this embodiment of this application.

Pressure outlet ports (1 and 2) of the first brake pipe 211 are connected to pressure inlet ports (5 and 6) of brake wheel cylinders of the first group of wheels.

Optionally, when the master brake cylinder 210 is a tandem master brake cylinder, the master brake cylinder 210 includes a first chamber 212 and a second chamber 222. A first piston in the first chamber 212 and a second piston in the second chamber 222 are connected by using a spring. When the first piston is displaced relative to a cylinder body, the spring may push the second piston to be displaced relative to the cylinder body. A pressure outlet port 21 of the first chamber 212 is connected to the pressure inlet port of the first brake pipe 211, and a pressure outlet port 22 of the second chamber 222 is connected to the pressure inlet port of the second brake pipe 221.

If a first control valve 130 is in an disconnected state, the first brake pipe 211 and the second brake pipe 221 are independent brake pipes, and pressure of brake fluid in the two brake pipes is respectively controlled by the first chamber 212 and the second chamber 222. If the first control valve 130 is in a connected state, the first brake pipe 211 and the second brake pipe 221 are connected brake pipes, the brake fluid may flow between the first brake pipe 211 and the second brake pipe 221, so that the pressure of the brake fluid in the two brake pipes is balanced.

In this way, when the first chamber 212 is faulty, but brake force needs to be applied to the first group of wheels 112, the first control valve 130 may be controlled to be in a connected state, and then the second chamber 222 may boost the pressure of the brake fluid in the second brake pipe 221 to transfer the pressure of the brake fluid in the second brake pipe 221 to the first brake pipe 211, to apply the brake force to the first group of wheels 112 by boosting the pressure of the brake fluid in the first brake pipe 211.

When the second chamber 222 is faulty, but brake force needs to be applied to the second group of wheels 122, the first control valve 130 may be controlled to be in a connected state, and then the first chamber 212 may boost the pressure of the brake fluid in the first brake pipe 211 to transfer the pressure of the brake fluid in the first brake pipe 11 to the second brake pipe 221, to apply the brake force to the second group of wheels 122 by boosting the pressure of the brake fluid in the second brake pipe 121.

Generally, when the first chamber 212 is faulty, to avoid a case in which the first chamber 212 intermittently boosts pressure and the like, a control valve 213 may be disposed at a pressure outlet port of the first chamber 212. After the first chamber 212 is faulty, the control valve 213 may be controlled to be in an disconnected state, and in this case, the first chamber 212 is disconnected from the first brake pipe 211. Accordingly, a control valve 214 may also be disposed at a pressure outlet port of the second chamber 222. After the second chamber 222 is faulty, the control valve 214 may be controlled to be in an disconnected state, and in this case, the second chamber 222 is disconnected from the second brake pipe 221. Therefore, the control valve 213 and the control valve 214 are also referred to as "isolation valves".

It should be noted that the first brake pipe 211 includes a first branch 115 and a second branch 116, and the second brake pipe may include a first branch 125 and a second branch 126. For connection manners of the foregoing four branches, and a configuration manner of fluid inlet valves and fluid outlet valves on the four branches, refer to the foregoing descriptions. For brevity, details are not described herein again.

Figure 3:
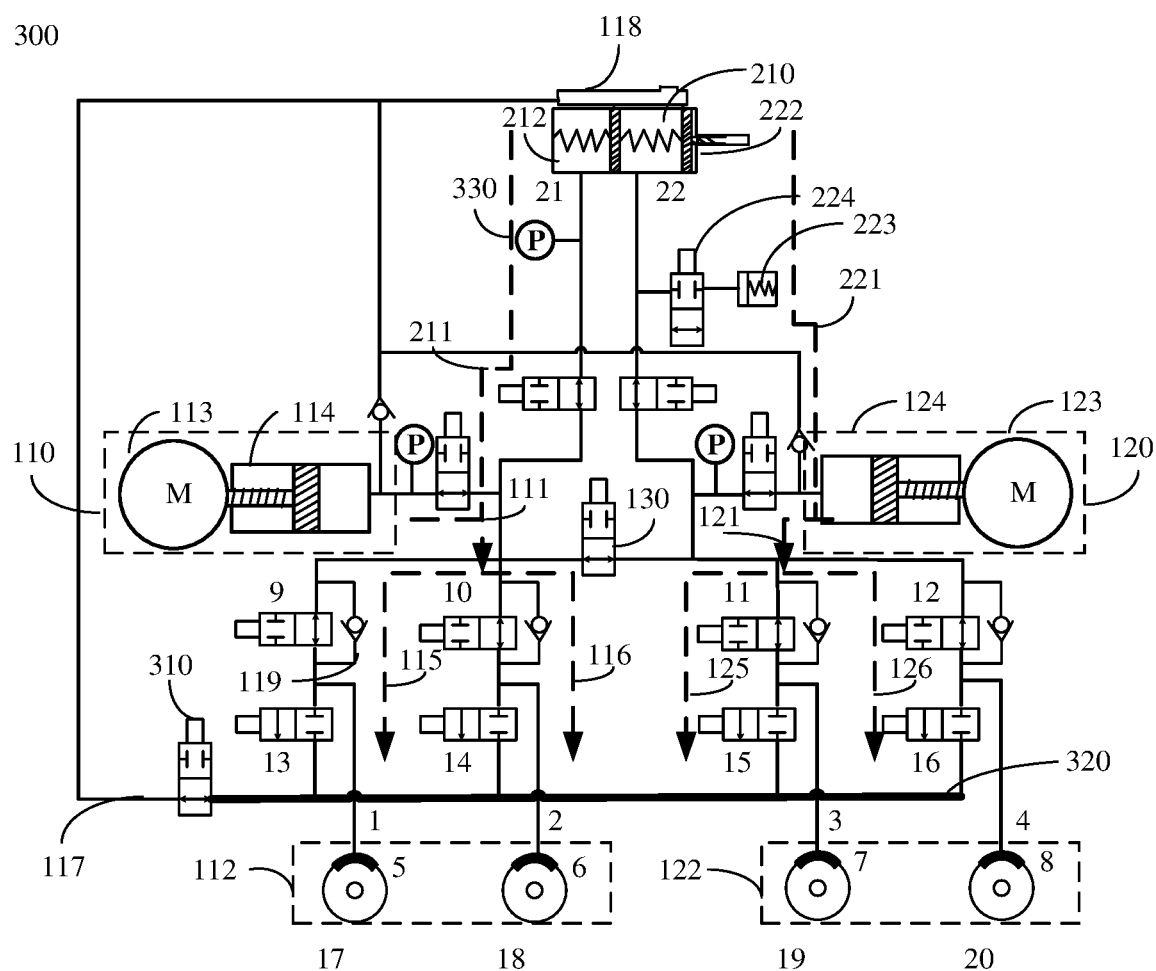
FIG. 3 is a schematic diagram of a brake system 300 according to an embodiment of this application.

A brake system according to an embodiment of this application is described below with reference to FIG. 3. FIG. 3 is a schematic diagram of a brake system 300 according to an embodiment of this application. The brake system 300 includes a first-level brake sub-system 100 and a second-level brake sub-system 200. It should be understood that parts in FIG. 2 with a same function as those in FIG. 1 use a same number. For brevity, for a specific function, refer to the foregoing descriptions. Details are not described herein again.

In the brake system 300 shown in FIG. 3, a first brake pipe 11 in the first-level brake sub-system 100 communicates with a first brake pipe 211 in the second-level brake sub-system 200, and a second brake pipe 121 in the first-level brake sub-system 100 communicates with a second brake pipe 221 in the second-level brake sub-system 200.

In other words, when a first control valve 130 is in an disconnected state, a first pressure boosting apparatus 110 and a first chamber 212 of a master brake cylinder are disposed on the first brake pipes (11 and 211) as pressure providing apparatuses. A second pressure boosting apparatus 120 and a second chamber 222 of the master brake cylinder are disposed on the second brake pipes (121 and 221) as pressure providing apparatuses. When the first control valve 130 is in a connected state, any one of the master brake cylinder 210, the first pressure boosting apparatus 110, and the second pressure boosting apparatus 120 may be used as a pressure providing apparatus in the brake system 300. The first-level brake sub-system 100 and the second-level brake sub-system 200 cooperate with each other, so that redundancy performance of the brake system 300 is improved.

In the brake system described above, if the first control valve 130 is faulty, the first brake pipes (11 and 211) and the second brake pipes (121 and 221) become independent pipes. In this case, a redundancy rate of the brake system is 2. To further improve redundancy performance of the brake system, a second control valve 310 may be further disposed on a fluid outlet pipe 117. The second control valve 310 is located on a fluid outlet pipe between a pressure inlet port of the fluid outlet pipe 117 and an inlet port of a fluid storage apparatus 118, or is located on a fluid outlet pipe between the inlet port of the fluid storage apparatus 118 and pressure outlet ports of a plurality of fluid outlet valves (13, 14, 15, and 16).

Accordingly, when the first control valve 130 is faulty or is in an disconnected state, the second control valve 310 may be controlled to be in an disconnected state, the plurality of fluid outlet valves (13, 14, 15, and 16) are controlled to be in a connected state, and a plurality of fluid inlet valves (9, 10, 11, and 12) are controlled to be in a connected state. In this case, pressure of brake fluid in a first segment of pipe (320) between the second control valve 310 and the pressure outlet ports of the fluid outlet valves (13, 14, 15, and 16) may be boosted, to accordingly boost pressure of a brake wheel cylinder.

For example, if brake force on the first group of wheels 112 needs to be boosted when the first control valve 130 is in an disconnected state or the first control valve 130 is faulty, and a pressure providing apparatus on the first brake pipe 11 is faulty, a pressure providing apparatus on the second brake pipe 121 may provide brake force for the first group of wheels 112. It is assumed that the second pressure boosting apparatus 120 provides brake force for the first group of wheels 112. In this case, the second control valve 310 may be controlled to be in an disconnected state, the fluid inlet valves (11 and 12) on the second brake pipe 121 are controlled to be in a connected state, the fluid outlet valves (15 and 16) on the second brake pipe 121 are controlled to be in a connected state, and the fluid outlet valves (13 and 14) on the first brake pipe 11 are also controlled to be in a connected state.

Accordingly, brake fluid may flow into the second brake pipe 121 from a pressure outlet port of the second pressure boosting apparatus 120, and flow into the fluid outlet valves (15 and 16) through two branches (125 and 126) of the second brake pipe 121, and then the brake fluid is transmitted to the fluid outlet valves (13 and 14) through the foregoing first segment of pipe 320, and is transmitted to brake wheel cylinders (17 and 18) of the first group of wheels 112 through the fluid outlet valves (13 and 14) along branches (115 and 116) of the first brake pipe 11, to provide brake force for the first group of wheels 112.

It should be noted that pressure of any one of the brake wheel cylinders (17, 18, 19, and 20) may be boosted by using the first segment of fluid outlet pipe 320. A specific method is similar to the foregoing process of boosting pressure of the brake wheel cylinders (17 and 18) by using the first segment of fluid outlet pipe 320. For brevity, details are not described below.

Optionally, the first control valve 130, the second control valve 310, the fluid outlet valves (13, 14, 15, and 16), the fluid inlet valves (9, 10, 11, and 12), isolation valves (119, 129, 213, and 214), and the like involved in the foregoing descriptions may be solenoid valves. After the brake system is powered on, a working status, to be specific, a connected state or an disconnected state, of the solenoid valve may be controlled by using a controller.

Optionally, the controller may further control working statuses of the first pressure boosting apparatus 110 and the second pressure boosting apparatus 120 in a wire-controlled braking manner. After the isolation valves (213 and 214) are controlled to be in an disconnected state, the controller may determine, based on an obtained pedal traveling distance, required brake force required by a driver. Then, the controller may send first control information to the first pressure boosting apparatus 110 based on the required brake force, to control the brake force applied by the first pressure boosting apparatus to the first group of wheels; and send second control information to the second pressure boosting apparatus 120, to control the brake force applied by the second pressure boosting apparatus 120 to the second group of wheels.

When the controller controls the first pressure boosting apparatus 110 and/or the second pressure boosting apparatus 120 to provide brake force for the wheel, the controller generally can only sense whether the first pressure boosting apparatus 110 and/or the second pressure boosting apparatus 120 fail/fails, but cannot sense whether the first brake pipe in and the second brake pipe 121 are faulty.

Therefore, to enable the controller to sense whether the first brake pipe in and the second brake pipe 121 are faulty, and to determine a working manner of the brake system in a timely manner, a pressure sensor 1 may be disposed at a pressure outlet port of the first pressure boosting apparatus 110, and the controller may sense, by using the pressure sensor 1, whether the first brake pipe 111 is faulty. Accordingly, a pressure sensor 2 may be disposed at a pressure outlet port of the second pressure boosting apparatus 120, and the controller may sense, by using the pressure sensor 2, whether the second brake pipe 121 is faulty.

Generally, the controller may detect, by using a pedal travel sensor 420, displacement of a piston in the master brake cylinder relative to the cylinder body of the master brake cylinder, in other words, a pedal traveling distance of a brake pedal. Specifically, after detecting the foregoing displacement, the pedal travel sensor 420 may send the displacement to the controller, and accordingly, the controller determines, based on the displacement, brake force applied to a wheel of a vehicle.

However, in the foregoing solution in which the controller detects the displacement by using the pedal travel sensor 420 to determine the brake force applied to the wheel of the vehicle, if the pedal travel sensor 420 is faulty, the controller cannot determine the brake force.

To avoid this case, in the brake system provided in this application, a pressure sensor 330 may be further disposed on the first brake pipe 211 and/or the second brake pipe 222. In this way, after the pedal travel sensor 420 fails, the controller may further detect pressure of brake fluid in the first brake pipe 211 and/or the second brake pipe 222 by using the pressure sensor 330, and determine, based on the pressure of the brake fluid, the brake force applied to the wheel of the vehicle.

To be specific, the brake system further includes the pressure sensor 330, the pressure sensor 330 is located on the first brake pipe 211 between the master brake cylinder 210 and the first pressure boosting apparatus 110, and the pressure sensor 330 is configured to detect the pressure that is of the brake fluid in the first brake pipe 211 and that is adjusted by the master brake cylinder 210. The pressure sensor 330 is further configured to send pressure information indicating the pressure to the controller.

Optionally, the second-level brake sub-system 200 may further include a pedal sense analog spring 223, and the pedal sense analog spring 223 is located on the second brake pipe 221. In this way, the brake fluid in the second brake pipe 221 may flow into the pedal sense analog spring 223, so that the pedal sense analog spring 223 determines displacement of the piston in the master brake cylinder 210 relative to the brake cylinder body by sensing the pressure of the brake fluid in the second brake pipe 221. In this way, the pedal sense analog spring 223 may send the detected pressure of the brake fluid to the controller, so that the controller determines the brake force on the wheel.

Generally, after the second-level brake sub-system 200 is faulty or the brake system enters a wire-controlled braking working mode, the isolation valves 213 and 214 are in an disconnected state. In this case, the pedal sense analog spring 223 may sense the pressure of the brake fluid in the second brake pipe 221, and send the sensed pressure to the controller.

Certainly, a control valve 224 may be further disposed between a pressure inlet port of the pedal sense analog spring 223 and the second brake pipe 221. When the pedal sense analog spring 223 does not need to work, the control valve 224 may be controlled to be in an disconnected state, to isolate the second brake pipe 221 from the pedal sense analog spring 223. Therefore, the control valve 224 is also referred to as an "isolation valve". When the control valve 224 is in a connected state, the second brake pipe 221 communicates with the pedal sense analog spring 223, and the pedal sense analog spring 223 is in a working state.

The brake system according to the embodiments of this application is described below with reference to FIG. 1 to FIG. 3. The brake system provided in this application may be applied to a vehicle. A vehicle that uses the foregoing brake system is described below with reference to FIG. 4.

Figure 4:
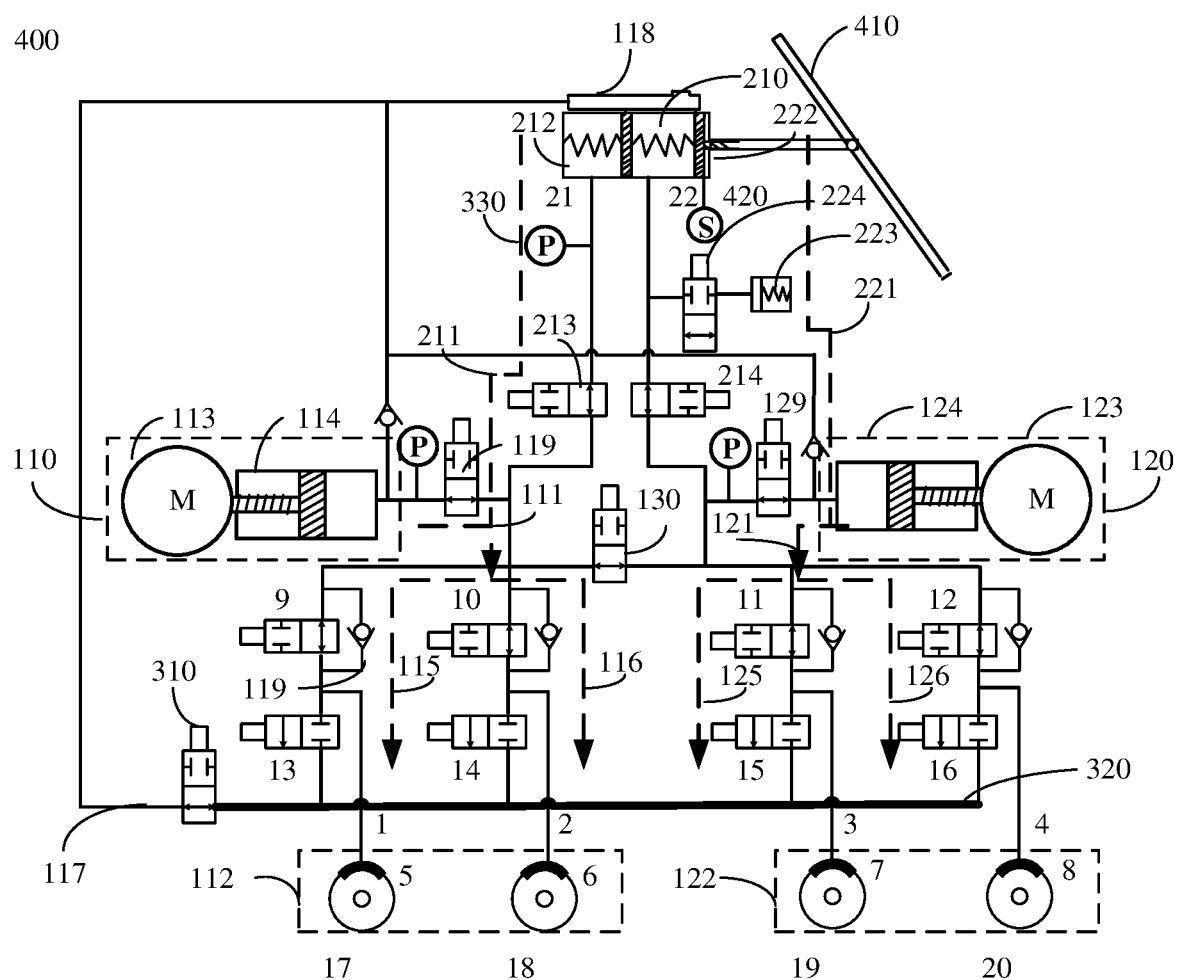
FIG. 4 is a schematic diagram of a vehicle according to an embodiment of this application.
Figure 5:
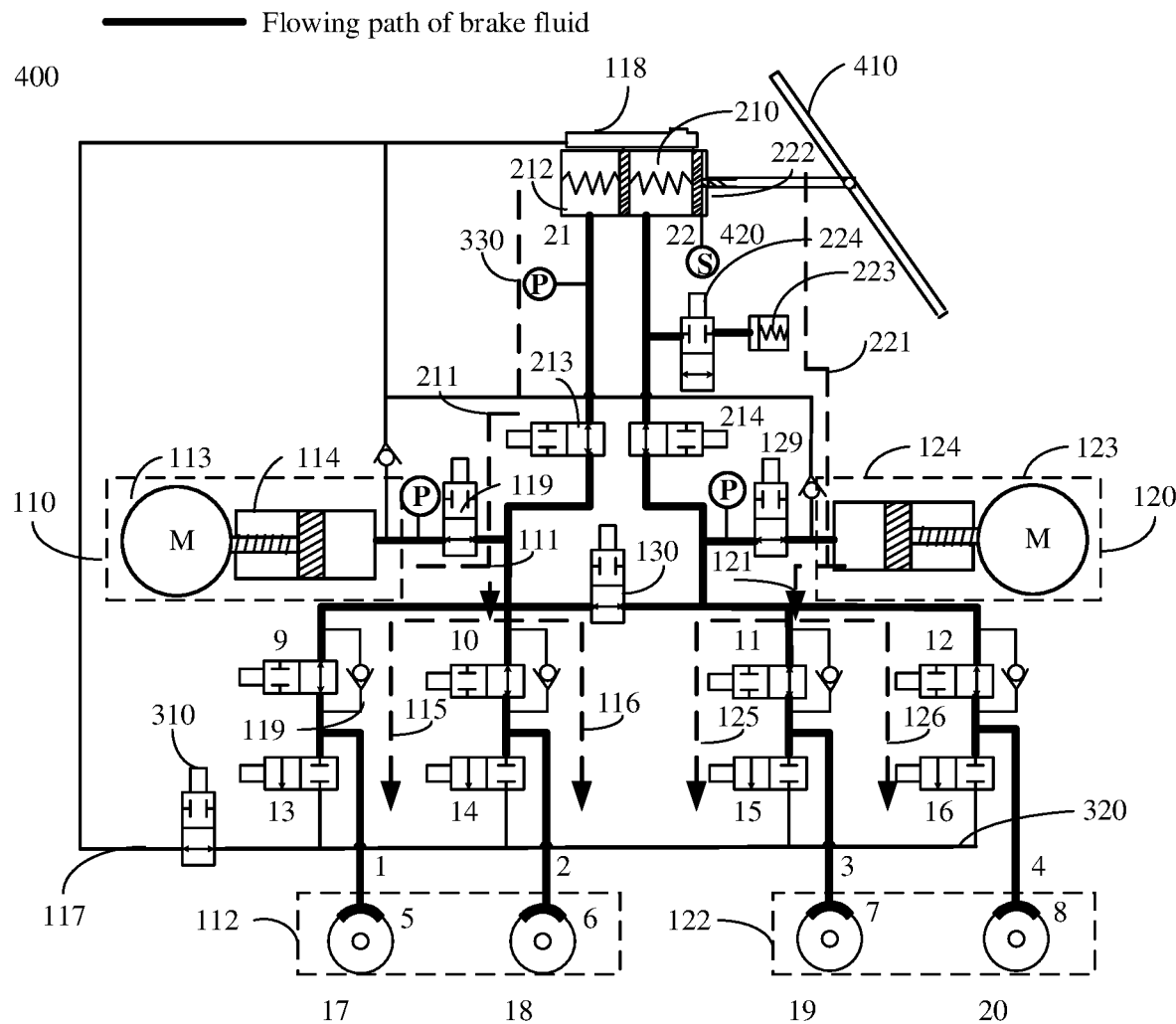
FIG. 5 is a schematic diagram of a flowing path of brake fluid in a brake system according to an embodiment of this application.
Figure 6:
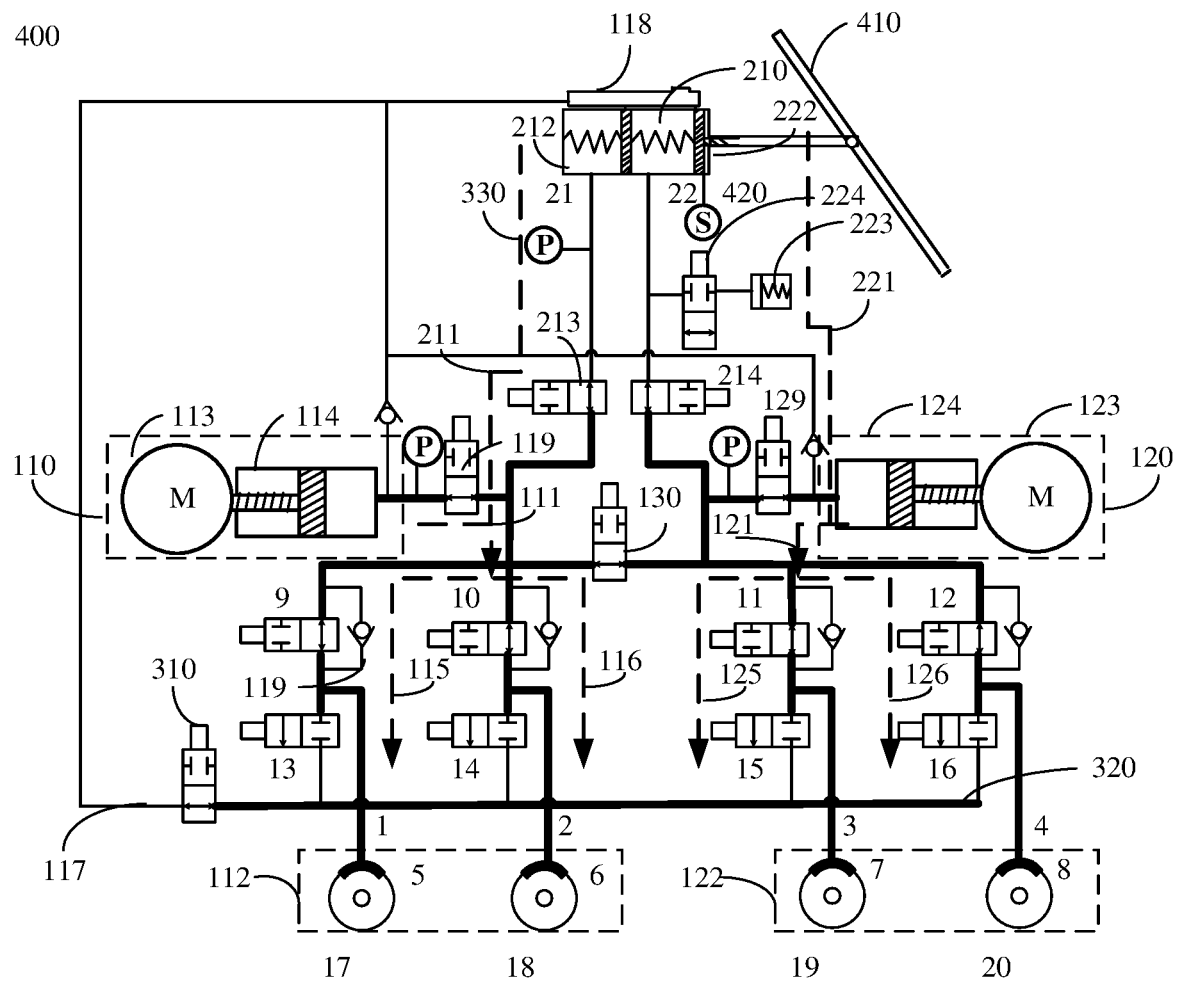
FIG. 6 is a schematic diagram of another flowing path of brake fluid in a brake system according to an embodiment of this application.
Figure 7:
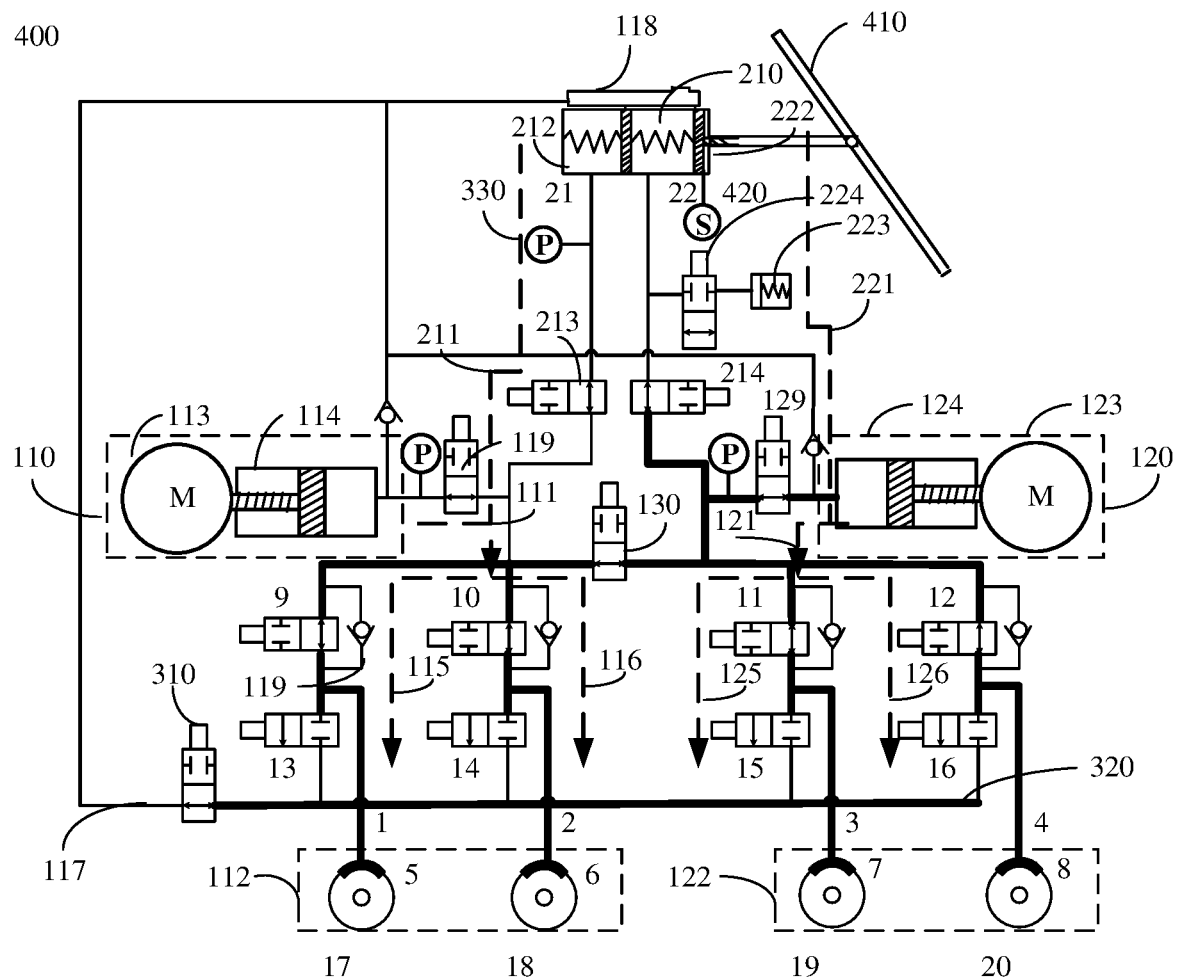
FIG. 7 is a schematic diagram of another flowing path of brake fluid in a brake system according to an embodiment of this application.
Figure 8:
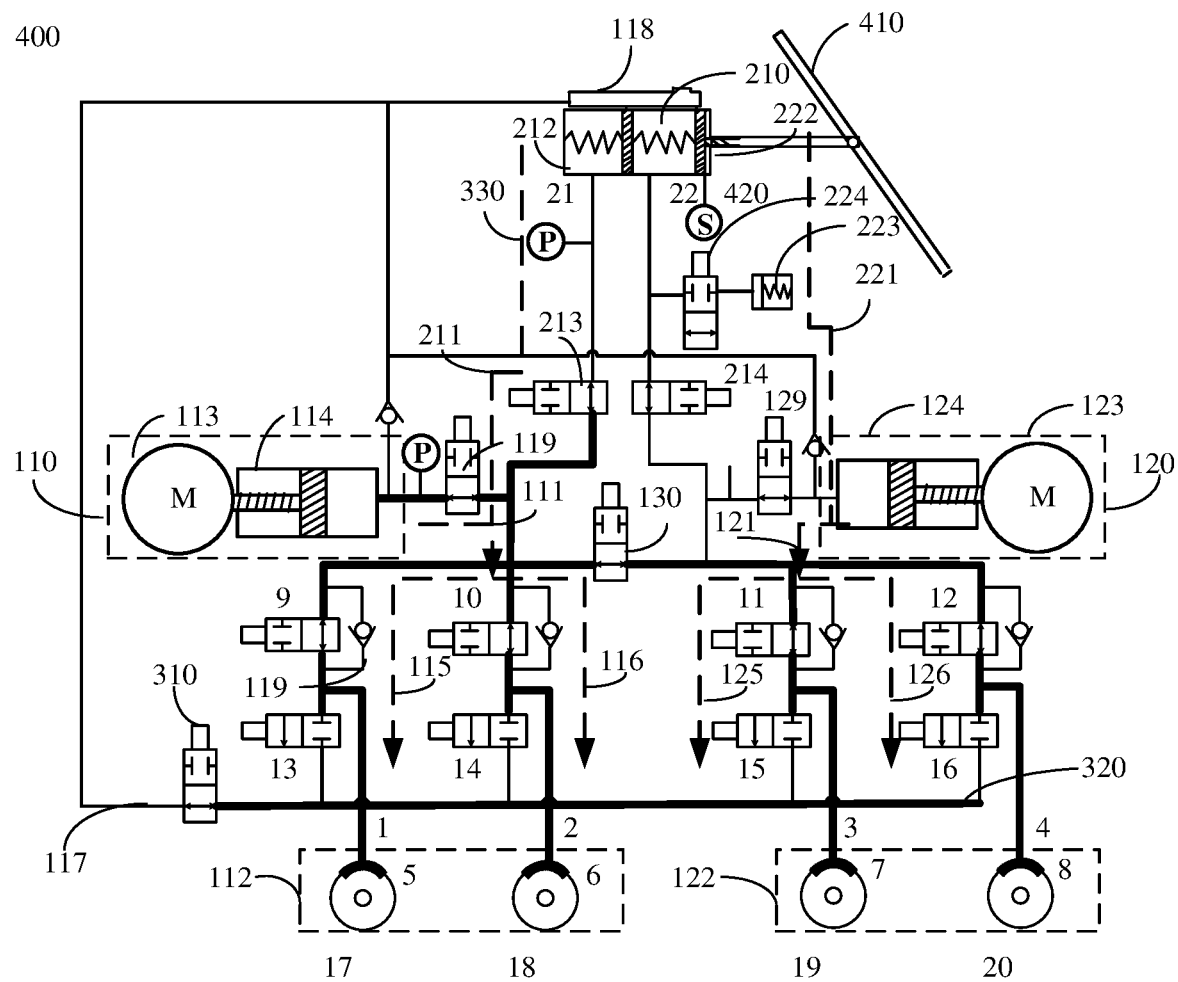
FIG. 8 is a schematic diagram of another flowing path of brake fluid in a brake system according to an embodiment of this application.
Figure 9:
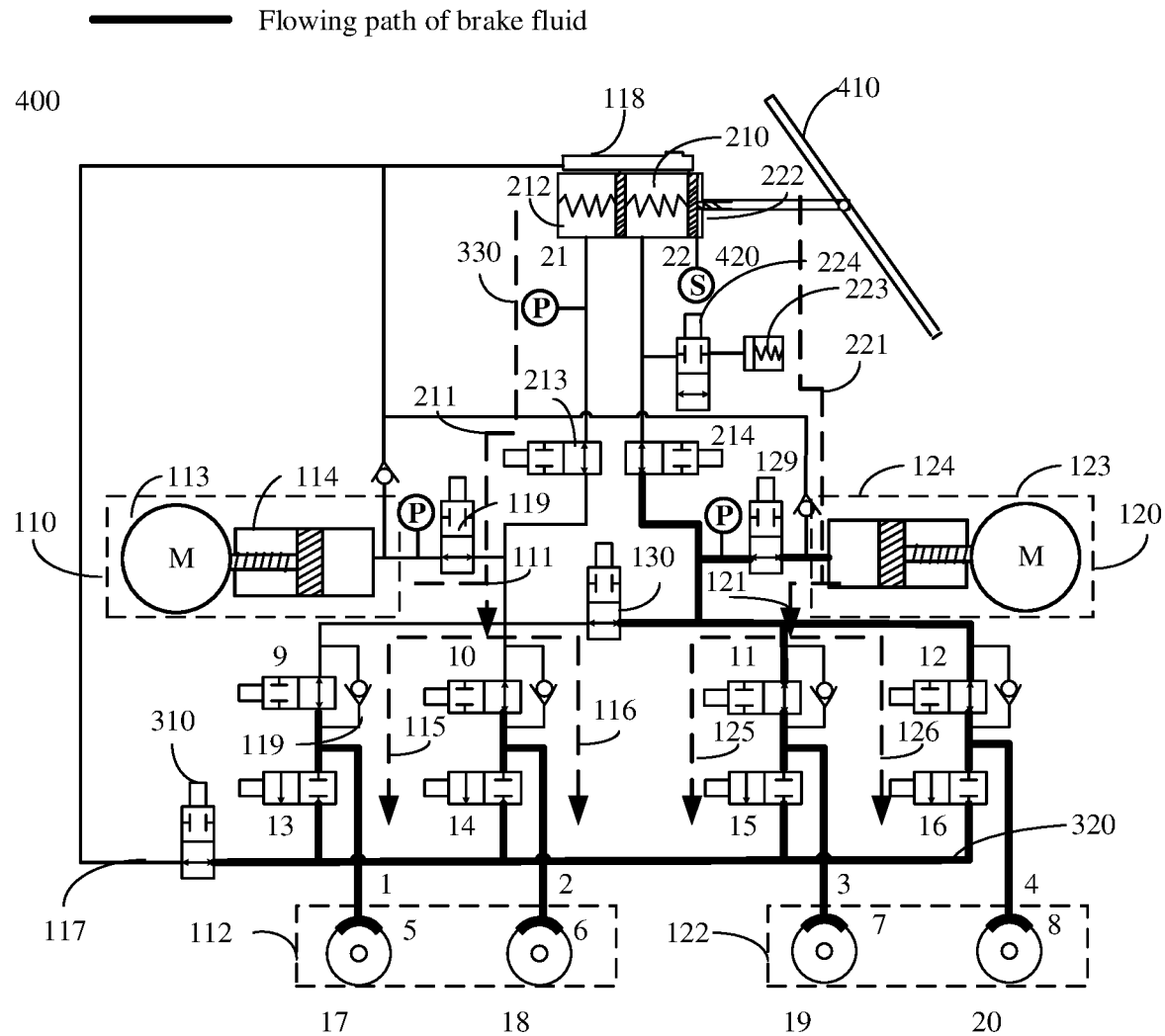
FIG. 9 is a schematic diagram of another flowing path of brake fluid in a brake system according to an embodiment of this application.
Figure 10:
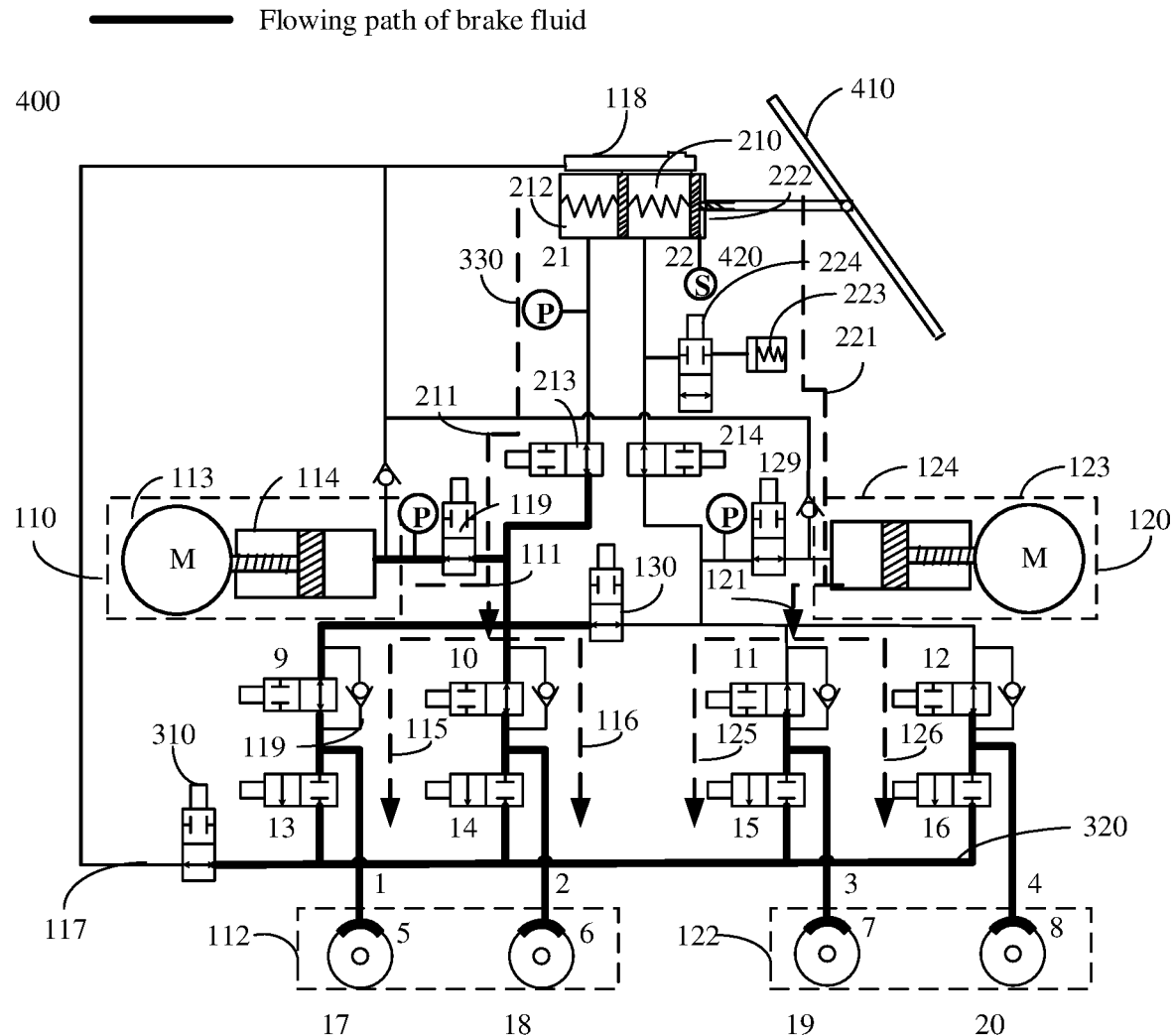
FIG. 10 is a schematic diagram of another flowing path of brake fluid in a brake system according to an embodiment of this application.
Figure 11:
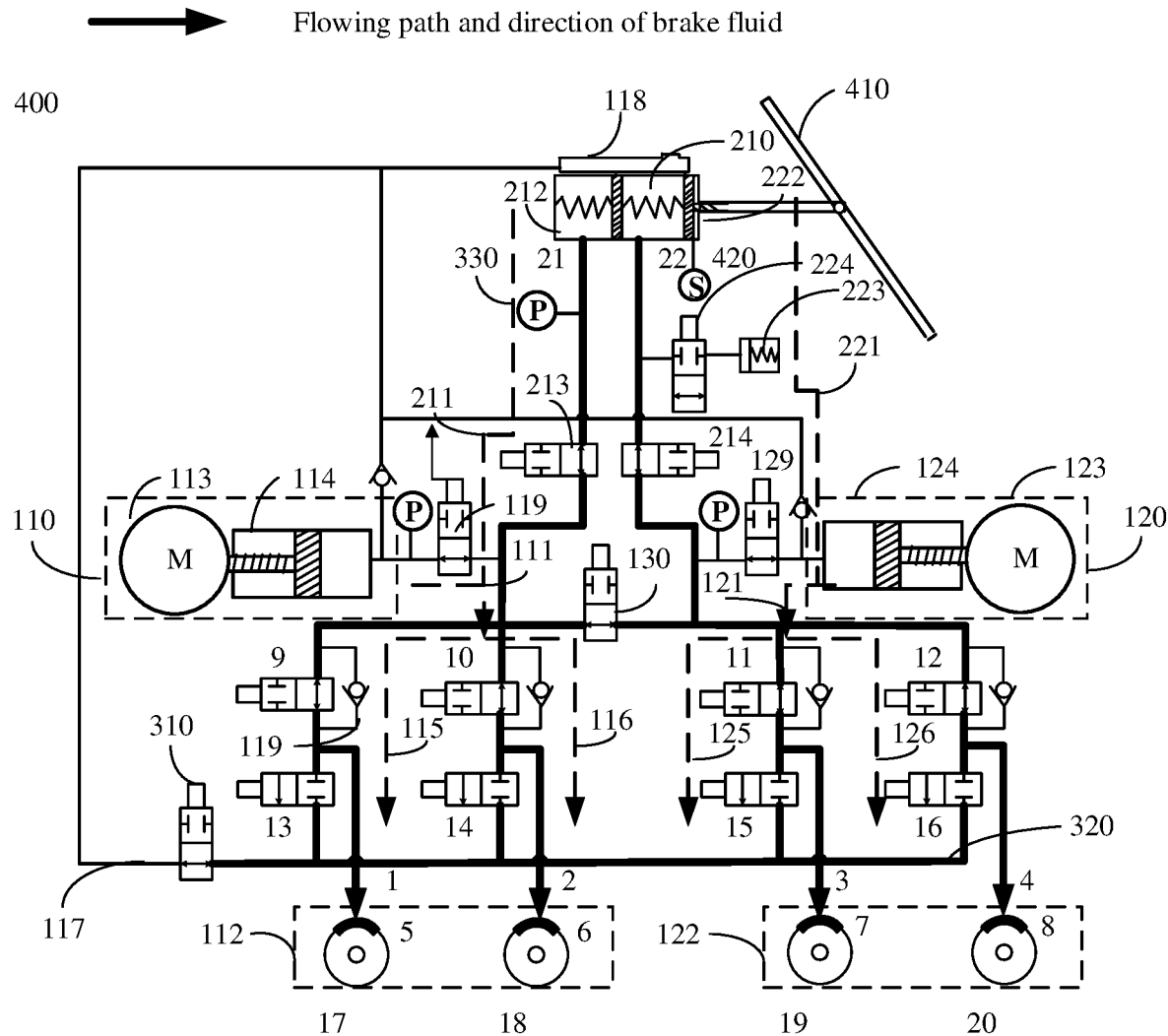
FIG. 11 is a schematic diagram of another flowing path of brake fluid in a brake system according to an embodiment of this application.

FIG. 4 is a schematic diagram of a vehicle according to an embodiment of this application. It should be understood that the vehicle 400 shown in FIG. 4 includes a first group of wheels 112, a second group of wheels 122, and any brake system described above. For brevity, the brake system is not described in detail below.

Optionally, the vehicle 400 further includes a brake pedal 410 and a pedal travel sensor 420, and the pedal travel sensor 420 is configured to detect displacement that is of a piston in a master brake cylinder relative to a cylinder body of the master brake cylinder and that is generated when the brake pedal pushes the piston, namely, a pedal traveling distance. The pedal travel sensor 420 is further configured to send the displacement to a controller, so that the controller determines, based on the displacement, brake force applied to a wheel of the vehicle.

A connection manner between brake elements in the brake system is described with reference to FIG. 1 to FIG. 4. A plurality of working modes of the brake system are described below with reference to FIG. 5 to FIG. 12. It should be noted that priorities of the plurality of working modes are not specifically limited in this application.

The vehicle 400 shown in FIG. 4 may be divided into three working modes: a non-pressure boosting manual braking mode, a wire-controlled braking mode, and an active braking mode. The non-pressure boosting manual braking mode may be understood as that only a second-level brake sub-system 200 provides brake force for the wheel. The active braking mode may be understood as that only a first-level brake sub-system 100 provides brake force for the wheel, and may be applied to a case such as adaptive cruise control or obstacle avoidance controlled by an advanced driving assistant system (advanced driving assistant system). The wire-controlled braking mode may be understood as that the controller controls, based on pedal depressing of a driver, a first pressure boosting apparatus 110 and a second pressure boosting apparatus 120 to provide brake force for the wheel.

In the foregoing three working modes, some functions in different modes may be implemented in a same implementation. For example, a same pressure boosting solution may be used in different modes. For another example, a same pedal brake force requirement calculation solution may be used in different modes. For still another example, a same redundant solution may be used in different modes. Therefore, for brevity, functions implemented in the brake system are classified into the following three scenarios for separate descriptions.

It is assumed that in the brake system 300, the isolation valves (119 and 129) are normally-open valves, the fluid inlet valves (9, 10, 11, and 12) are normally-open valves, the fluid outlet valves (13, 14, 15, and 16) are normally-closed valves, the isolation valves (213 and 214) are normally-open valves, the first control valve 130 is a normally-closed valve, the second control valve 310 is a normally-open valve, and the control valve 224 is a normally-closed valve.

It should be noted that the normally-open valve and the normally-closed valve are default states of a control valve before the control valve is powered on. When the controller needs to adjust a status of the control valve, the control valve whose status is to be adjusted may be powered on, so that the control valve can be controlled to be in an disconnected state or a connected state.

Scenario 1: A pedal brake force requirement calculation solution and a redundant solution for pedal brake force requirement calculation in the brake system in the wire-controlled braking mode.

In the wire-controlled braking mode, the controller controls the isolation valves (213 and 214) to be in an disconnected state, and controls the control valve 224 to be in a connected state, so that the pedal sense simulator 223 is connected to the second brake pipe 221, and another control valve in the brake system maintains the foregoing default state.

In this way, a driver depresses the brake pedal 410 to push, by using a push rod, a piston in the master brake cylinder 210 to be displaced relative to the master brake cylinder 210. Brake fluid in the second chamber 222 is pressed into the second brake pipe 221, and brake fluid in the first chamber 212 is pressed into the first brake pipe 211. Because the isolation valves (213 and 214) are in an disconnected state, the brake fluid in the two brake pipes is blocked at the isolation valves (213 and 214), and the brake fluid in the second brake pipe 221 is pressed into the pedal sense simulator 223 by using the control valve 224. Pressure of the brake fluid in the first brake pipe 211 is boosted under an action of the master brake cylinder 210.

A pedal brake force requirement calculation solution in an embodiment of this application is described below based on the foregoing described working status of each brake element in the brake system in the wire-controlled braking mode.

The controller calculates required brake force of the driver based on a pedal displacement measured by the pedal travel sensor 420, and feeds back the required brake force to the first pressure boosting apparatus no and the second pressure boosting apparatus 120.

The first pressure boosting apparatus no and the second pressure boosting apparatus 120 control, based on the foregoing required brake force, the motors (113 and 123) to compress brake fluid by using the hydraulic cylinders (114 and 124) and provide brake force for the brake wheel cylinders (17, 18, 19, and 20) by using the isolation valves (119 and 129).

As a redundant solution of the pedal brake force requirement calculation solution, when the pedal travel sensor 42031 is faulty, the pressure sensor 330 may be used to measure the pressure of the brake fluid in the first brake pipe 211, determine brake force required by the driver, and then feed back the brake force to the first pressure boosting apparatus no and the second pressure boosting apparatus 120.

Accordingly, the first pressure boosting apparatus no and the second pressure boosting apparatus 120 control, based on the brake force, the motors (113 and 123) to compress brake fluid by using the hydraulic cylinders (114 and 124) and provide brake force for the brake wheel cylinders (17, 18, 19, and 20) by using the isolation valves (119 and 129). For a flowing path of the brake fluid in the brake system, refer to FIG. 5.

It should be noted that neither of the foregoing two solutions for pedal sense simulation directly affects implementation of dynamics functions such as an antilock brake system (ABS), a traction control system (TCS), and an electronic stability system (ESC). To implement dynamics control algorithms such as the TCS, the ABS, and the ESC, a single brake wheel cylinder needs to be controlled. In this case, a single fluid inlet valve and a single fluid outlet valve may be controlled with assistance of the first pressure boosting apparatus 110 and the second pressure boosting apparatus 120 to implement pressure boosting, pressure maintenance, and pressure reduction operations for the single brake wheel cylinder.

When the driver releases the brake pedal 410, the displacement of the piston in the master brake cylinder relative to the cylinder body is restored to 0. Brake fluid in the pedal sense simulator 223 flows back from the control valve 224 to the second chamber 222 in an opposite direction, and finally flows into the fluid storage apparatus 118. Hydraulic cylinders (114 and 124) in the first pressure boosting apparatus 110 and the second pressure boosting apparatus 120 work reversely, pressure in the brake wheel cylinders (17, 18, 19, and 20) is greater than pressure in the hydraulic cylinders (114 and 124), and the brake fluid is separately returned from the brake wheel cylinders (17, 18, 19, and 20) to the hydraulic cylinders (114 and 124) by using respective corresponding fluid inlet valves (9, 10, 11, and 12) and a one-way valve along the brake pipes.

Optionally, the isolation valves (213 and 214) may be further controlled to be in a connected state, so that the brake fluid is returned from the brake wheel cylinders (17, 18, 19, and 20) to the fluid storage apparatus 118 by using the isolation valves (213 and 214), the second chamber 222, and the first chamber 212.

When pressure needs to be reduced rapidly, the fluid outlet valves (13, 14, 15, and 16) may be further turned on, so that brake fluid in the brake wheel cylinders (17, 18, 19, and 20) flows back to the fluid storage apparatus 118.

Scenario 2: An active pressure boosting solution in the active braking mode and a redundant solution for active pressure boosting.

Similar to the active pressure boosting solution in the wire-controlled braking mode described in the scenario 1, the brake system may directly use the first pressure boosting apparatus 110 and the second pressure boosting apparatus 120 to perform braking. A difference from the wire-controlled braking mode described in the scenario 1 lies in that the driver does not need to operate the brake pedal 410 in the active braking mode.

If the controller determines, by analyzing information such as an environment condition, a vehicle status, an ADAS status, and a driver input, that the vehicle needs to perform the active braking mode, the isolation valves (213 and 214) are in an disconnected state, and another control valve maintains the foregoing default state. The controller sends required brake force to the first pressure boosting apparatus 110 and the second pressure boosting apparatus 120. The first pressure boosting apparatus 110 and the second pressure boosting apparatus 120 provide brake pressure for the brake wheel cylinders (17, 18, 19, and 20) based on the brake force. For a flowing path of the brake fluid in the brake system, refer to FIG. 6.

When pressure needs to be reduced, a first hydraulic cylinder 114 and a second hydraulic cylinder 124 work reversely under an action of the motors (113 and 123), pressure in the brake wheel cylinders (17, 18, 19, and 20) is greater than pressure in the first hydraulic cylinder 114 and the second hydraulic cylinder 124, and brake fluid is separately returned from the brake wheel cylinders (17, 18, 19, and 20) to the first hydraulic cylinder 114 and the second hydraulic cylinder 124 by using the respective fluid inlet valves (9, 10, 11, and 12) and a one-way valve along the brake pipes.

Optionally, the isolation valves (213 and 214) may be further controlled to be in a connected state, so that the brake fluid is returned from the brake wheel cylinders (17, 18, 19, and 20) to the fluid storage apparatus 118 by using the isolation valves (213 and 214), the second chamber 222, and the first chamber 212.

When pressure needs to be reduced rapidly, the fluid outlet valves (13, 14, 15, and 16) may be further turned on, so that brake fluid in the brake wheel cylinders (17, 18, 19, and 20) flows back to the fluid storage apparatus 118.

It should be noted that neither of the foregoing two solutions for pedal sense simulation directly affects implementation of dynamics functions such as an ABS, a TCS, and an ESC. To implement dynamics control algorithms such as the TCS, the ABS, and the ESC, a single brake wheel cylinder needs to be controlled. In this case, a single fluid inlet valve and a single fluid outlet valve may be controlled with assistance of the first pressure boosting apparatus 110 and the second pressure boosting apparatus 120 to implement pressure boosting, pressure maintenance, and pressure reduction operations for the single brake wheel cylinder.

Four redundant solutions for active pressure boosting in the active braking mode are described below. It should be noted that the redundant solutions for active pressure boosting may be further applied to the wire-controlled braking mode. Because the solutions are essentially the same, for brevity, redundant solutions for active pressure boosting in the wire-controlled braking mode are not specifically described below.

Redundant solution 1: When the first pressure boosting apparatus 110 is faulty, the first control valve 130 is controlled to be in a connected state. In this case, the first brake pipe 11 is connected to the second brake pipe 121, and the second pressure boosting apparatus 120 works and provides brake pressure for the brake wheel cylinders (17, 18, 19, and 20) based on brake force fed back by the controller. In this case, for a flowing path of the brake fluid in the brake system, refer to FIG. 7.

Redundant solution 2: When the second pressure boosting apparatus 120 is faulty, the first control valve 130 is controlled to be in a connected state. In this case, the first brake pipe 111 is connected to the second brake pipe 121, and the first pressure boosting apparatus 110 works and provides brake pressure for the brake wheel cylinders (17, 18, 19, and 20) based on brake force fed back by the controller. In this case, for a flowing path of the brake fluid in the brake system, refer to FIG. 8.

It should be noted that neither of the foregoing two solutions for pedal sense simulation directly affects implementation of dynamics functions such as an ABS, a TCS, and an ESC. To implement dynamics control algorithms such as the TCS, the ABS, and the ESC, a single brake wheel cylinder needs to be controlled. In this case, a single fluid inlet valve and a single fluid outlet valve may be controlled with assistance of the first pressure boosting apparatus 110 and the second pressure boosting apparatus 120 to implement pressure boosting, pressure maintenance, and pressure reduction operations for the single brake wheel cylinder.

Redundant solution 3: When both the first pressure boosting apparatus 110 and the first control valve 130 are faulty, the second control valve 310 is controlled to be in an disconnected state, all fluid outlet valves (13, 14, 15, and 16) are turned on, and another control valve is in the foregoing default state. The second pressure boosting apparatus 120 works and presses brake fluid into the second brake pipe 121 based on brake force fed back by the controller, and the brake fluid flows into the first segment of fluid outlet pipe 320 through the fluid inlet valves (11 and 12) and the fluid outlet valves (15 and 16). When the second control valve 310 is blocked, the brake fluid flows into the fluid outlet valves (13 and 14) through the first segment of fluid outlet pipe 320. With isolation of the one-way valve, brake fluid flowing out of the fluid outlet valves (13 and 14) flows into the brake wheel cylinders (17 and 18) through the first branch 115 and the second branch 116, and finally provides brake pressure for the brake wheel cylinders (17 and 18). Accordingly, a part of the brake fluid that is pressed into the second brake pipe 121 may flow into the brake wheel cylinders (19 and 20) through the first branch 125 and the second branch 126. For a flowing path of the brake fluid in the brake system, refer to FIG. 9.

Redundant solution 4: When both the second pressure boosting apparatus 120 and the first control valve 130 are faulty, the second control valve 310 is controlled to be in an disconnected state, all fluid outlet valves (13, 14, 15, and 16) are turned on, and another control valve is in the foregoing default state. The first pressure boosting apparatus 110 works and presses brake fluid into the first brake pipe 11 based on brake force fed back by the controller, and the brake fluid flows into the first segment of fluid outlet pipe 320 through the fluid inlet valves (9 and 10) and the fluid outlet valves (13 and 14). When the second control valve 310 is blocked, the brake fluid flows into the fluid outlet valves (15 and 16) through the first segment of fluid outlet pipe 320. With isolation of the one-way valve, brake fluid flowing out of the fluid outlet valves (15 and 16) flows into the brake wheel cylinders (19 and 20) through the first branch 125 and the second branch 126, and finally provides brake pressure for the brake wheel cylinders (19 and 20). Accordingly, a part of the brake fluid that is pressed into the first brake pipe in may flow into the brake wheel cylinders (17 and 18) through the first branch 115 and the second branch 116. For a flowing path of the brake fluid in the brake system, refer to FIG. 10.

Scenario 3: Redundant backup solution for manual braking. To be specific, when both the first pressure boosting apparatus 110 and the second pressure boosting apparatus 120 fail, mechanical braking can still be implemented if the driver depresses the pedal, so that it is ensured that the vehicle reliably decelerates.

All control valves in the brake system are in the default state. The driver depresses the brake pedal 410, pushes the brake fluid in the second chamber 222 into the second brake pipe 221, and pushes the brake fluid in the first chamber 212 into the first brake pipe 211; and finally, the brake fluid flows into the brake wheel cylinders (17, 18, 19, and 20) through the fluid inlet valves (9, 10, 11, and 12) along the first brake pipe 211 and the second brake pipe 221. In this way, manual braking is implemented. For a flowing path of the brake fluid in the brake system, refer to FIG. 11.

When the driver releases the brake pedal 410, the piston in the master brake cylinder returns to an initial position under an action of a return spring, and the brake pedal 410 returns to an initial position by using a push rod. In this case, the brake fluid flows back from the brake wheel cylinders (17, 18, 19, and 20) into the second chamber 222 and the first chamber 212 through the fluid inlet valves (9, 10, 11, and 12) and a one-way valve in opposite directions, and finally flows into the fluid storage apparatus 118. For a flowing path of the brake fluid in the brake system, refer to FIG. 12.

The brake system and the vehicle according to the embodiments of this application are described above with reference to FIG. 1 to FIG. 12. A control method based on the brake system according to an embodiment of this application is described below with reference to FIG. 13 and FIG. 14A, FIG. 14B, and FIG. 14C. It should be noted that the control method shown in FIG. 13 may be performed by the controller in the brake system.

Figures 12, 13:
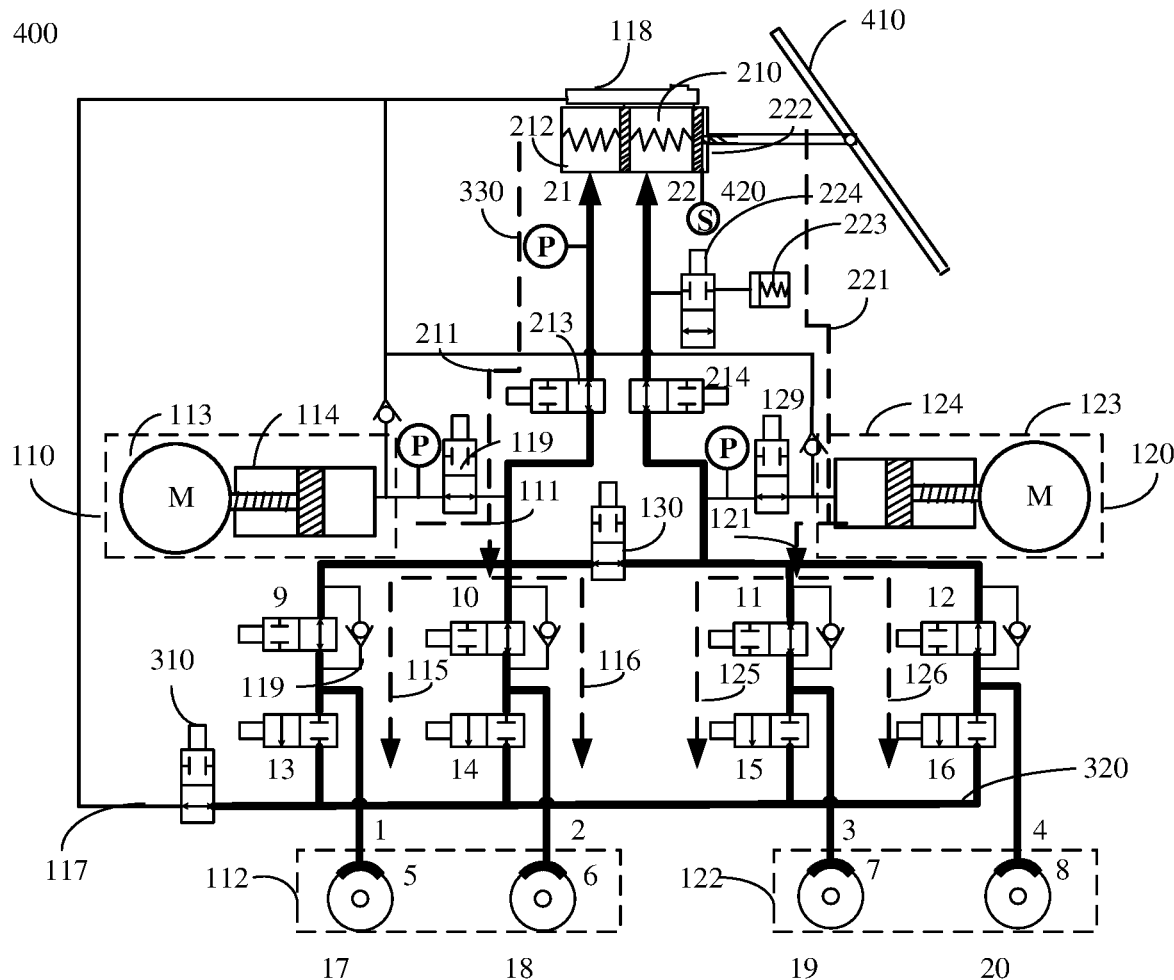
FIG. 12 is a schematic diagram of another flowing path of brake fluid in a brake system according to an embodiment of this application.
FIG. 13 is a flowchart of a control method for a brake system according to an embodiment of this application.

FIG. 13 is a flowchart of a control method for a brake system according to an embodiment of this application. The method shown in FIG. 13 includes step 1310 and step 1320. The method shown in FIG. 13 may be used in combination with the brake system and the vehicle that are described above. Either of the foregoing first brake pipe 11 and second brake pipe 121 is referred to as a "target brake pipe".

1310: A controller determines that a pressure providing apparatus on a target brake pipe is faulty.

The pressure providing apparatus may include a master brake cylinder 210 or a pressure boosting apparatus. If the target brake pipe is a first brake pipe 11, the pressure providing apparatus may be the master brake cylinder 210 or a first pressure boosting apparatus 110. If the target brake pipe is a second brake pipe 121, the pressure providing apparatus may be the master brake cylinder 210 or a second pressure boosting apparatus 120.

1320: The controller controls a first control valve 130 to be in a connected state, so that the first brake pipe in is connected to the second brake pipe 121.

If the first brake pipe 11 is connected to the second brake pipe 121, brake fluid may flow in the first brake pipe in and the second brake pipe 121, and brake force is provided for a brake wheel cylinder by using pressure of the brake fluid.

In this embodiment of this application, after the pressure providing apparatus on the target brake pipe is faulty, the controller may control the first control valve 130 to be in a connected state, so that the brake fluid flows in the first brake pipe in and the second brake pipe 121, and the brake force is provided for the brake wheel cylinder by using the pressure of the brake fluid, thereby avoiding a problem in a conventional brake system that the first brake pipe and the second brake pipe are two mutually independent brake paths, and after a pressure providing apparatus in one brake pipe is faulty, the brake pipe cannot control brake force on a brake wheel cylinder on the brake pipe. This helps improve redundancy performance of a brake system is improved.

Optionally, the target brake pipe is the first brake pipe (111), the pressure providing apparatus includes the first pressure boosting apparatus (110), and the method further includes: The controller controls the second pressure boosting apparatus (120) to adjust pressure of brake fluid in the second brake pipe (121), to adjust pressure of brake fluid in the first brake pipe (111).

Optionally, the target brake pipe is the second brake pipe (121), the pressure providing apparatus includes the second pressure boosting apparatus (120), and the method further includes: The controller controls the first pressure boosting apparatus (110) to adjust pressure of brake fluid in the first brake pipe (111), to adjust pressure of brake fluid in the second brake pipe (121).

Optionally, the brake system further includes a tandem master brake cylinder (210). A first chamber (212) of the master brake cylinder (210) communicates with the first brake pipe (111), and is configured to adjust the pressure of the brake fluid in the first brake pipe (111), to control brake force applied to a first group of wheels (112). A second chamber (222) of the master brake cylinder (210) communicates with the second brake pipe (121), and is configured to adjust the pressure of the brake fluid in the second brake pipe (121), to control brake force applied to a second group of wheels (122). The method further includes: If the first chamber (212) is faulty, the controller controls the first control valve (130) to be in a connected state, so that the pressure of the brake fluid in the second brake pipe (121) and the pressure of the brake fluid in the first brake pipe (111) are balanced; or if the second chamber (222) is faulty, the controller controls the first control valve (130) to be in a connected state, so that the pressure of the brake fluid in the first brake pipe (111) and the pressure of the brake fluid in the second brake pipe (121) are balanced.

To further improve redundancy performance of the brake system, a second control valve 310 may be further disposed on a fluid outlet pipe 117. After the second control valve 310 is in an disconnected state, a first segment of pipe 320 may be configured to provide brake force for brake wheel cylinders (17, 18, 19, and 20).

Optionally, the brake system further includes a fluid storage apparatus (118) for storing brake fluid, a plurality of fluid outlet valves (140), and a second control valve (310). Pressure outlet ports of the plurality of fluid outlet valves (140) are connected to a pressure inlet port of a fluid outlet pipe (117), a pressure outlet port of the fluid outlet pipe (117) is connected to an inlet port of the fluid storage apparatus (118), and the second control valve (310) is located on a fluid outlet pipe (117) between the pressure inlet port of the fluid outlet pipe (117) and the inlet port of the fluid storage apparatus (118). The method further includes: The controller determines that the first pressure boosting apparatus (110) and the first control valve (130) are faulty; and the controller controls the second control valve (310) to be in an disconnected state, and controls the plurality of fluid outlet valves (140) to be in a connected state, so that brake fluid in a first segment of pipe (320) is pressed into a brake wheel cylinder of a wheel of a vehicle by the second pressure boosting apparatus (120), to control brake force applied to the wheel of the vehicle, where the first segment of pipe (320) is a pipe between the pressure inlet port of the fluid outlet pipe (117) and the second control valve (310).

Optionally, the method further includes: The controller determines that the second pressure boosting apparatus (120) and the first control valve (130) are faulty; and the controller determines the first control valve (310) to be in an disconnected state, and controls the plurality of fluid outlet valves (140) to be in a connected state, so that the brake fluid in the first segment of pipe (320) is pressed into a brake wheel cylinder of a wheel of a vehicle by the first pressure boosting apparatus (110), to control brake force applied to the wheel of the vehicle.

In a non-pressure boosting manual braking mode and a wire-controlled braking mode of the brake system, the controller generally needs to determine, by using a pedal travel sensor 420, brake force required by a driver. However, if the pedal travel sensor 420 is faulty, the controller cannot sense the brake force required by the driver.

Therefore, to avoid the foregoing case, a pressure sensor 330 is further disposed in the brake system provided in this embodiment of this application, and is located on a first brake pipe 212 and/or a second brake pipe 222, and is configured to sense pressure that is output from a pressure outlet port of the master brake cylinder 210 and that flows into the first brake pipe 212 and/or the second brake pipe 222. In this way, after determining pressure of brake fluid in the first brake pipe 212 and/or the second brake pipe 222 by using the pressure controller 330, the controller may determine, based on the pressure of the brake fluid, the brake force required by the driver.

Optionally, the brake system further includes a pressure sensor (330) and a pedal travel sensor (420). The pressure sensor (330) is configured to detect the pressure that is of the brake fluid in the first brake pipe (111) and that is adjusted by the master brake cylinder (210). The pedal travel sensor (420) is configured to detect a pedal traveling distance of a brake pedal of the vehicle. The method further includes: The controller receives pressure information that is sent by the pressure sensor (330) and that is used to indicate the pressure; and if the pedal travel sensor (420) fails, the controller allocates brake force to the first group of wheels (112) and/or the second group of wheels (122) based on the pedal traveling distance.

Figure 14A:
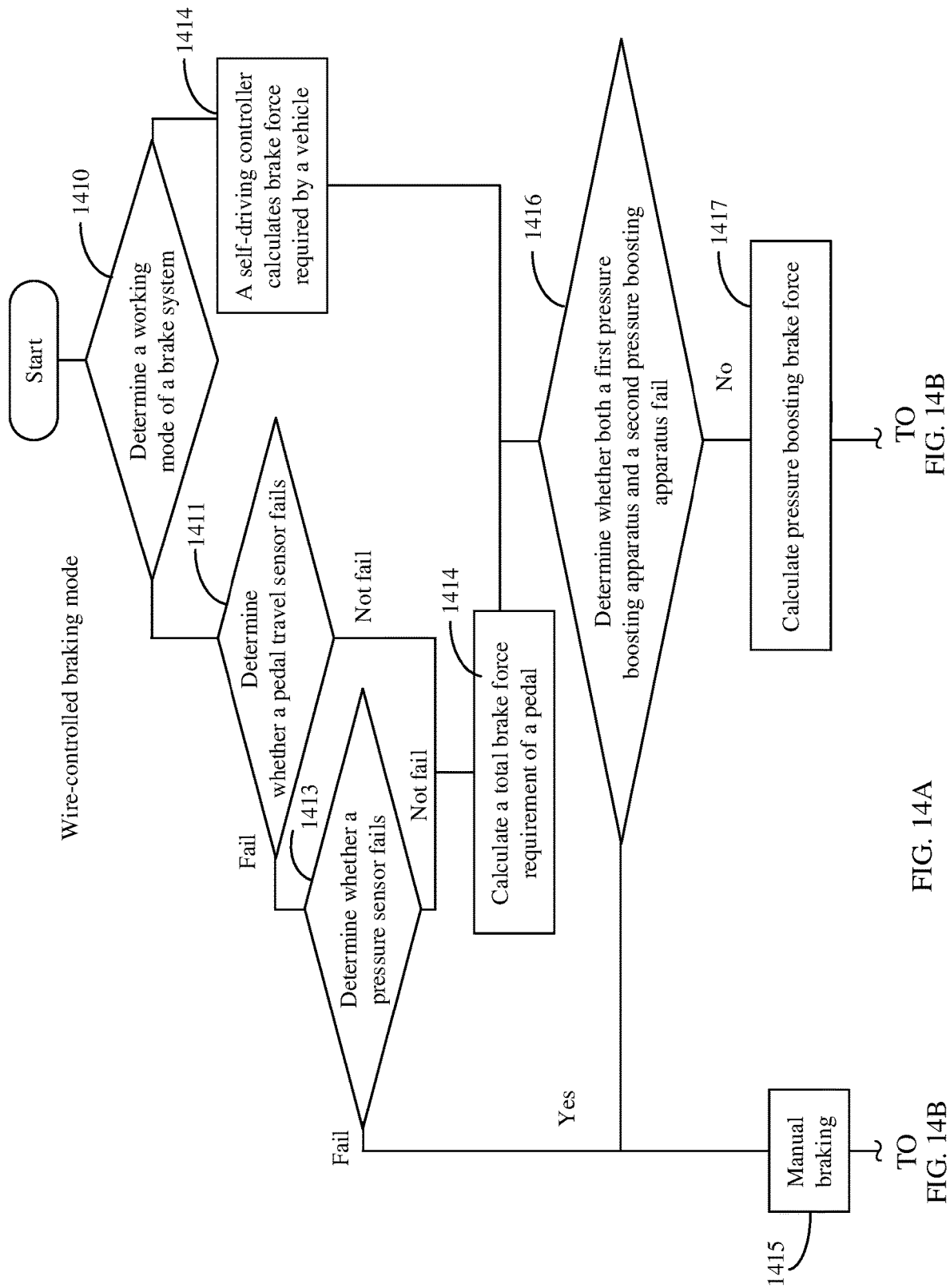
Figure 14B:
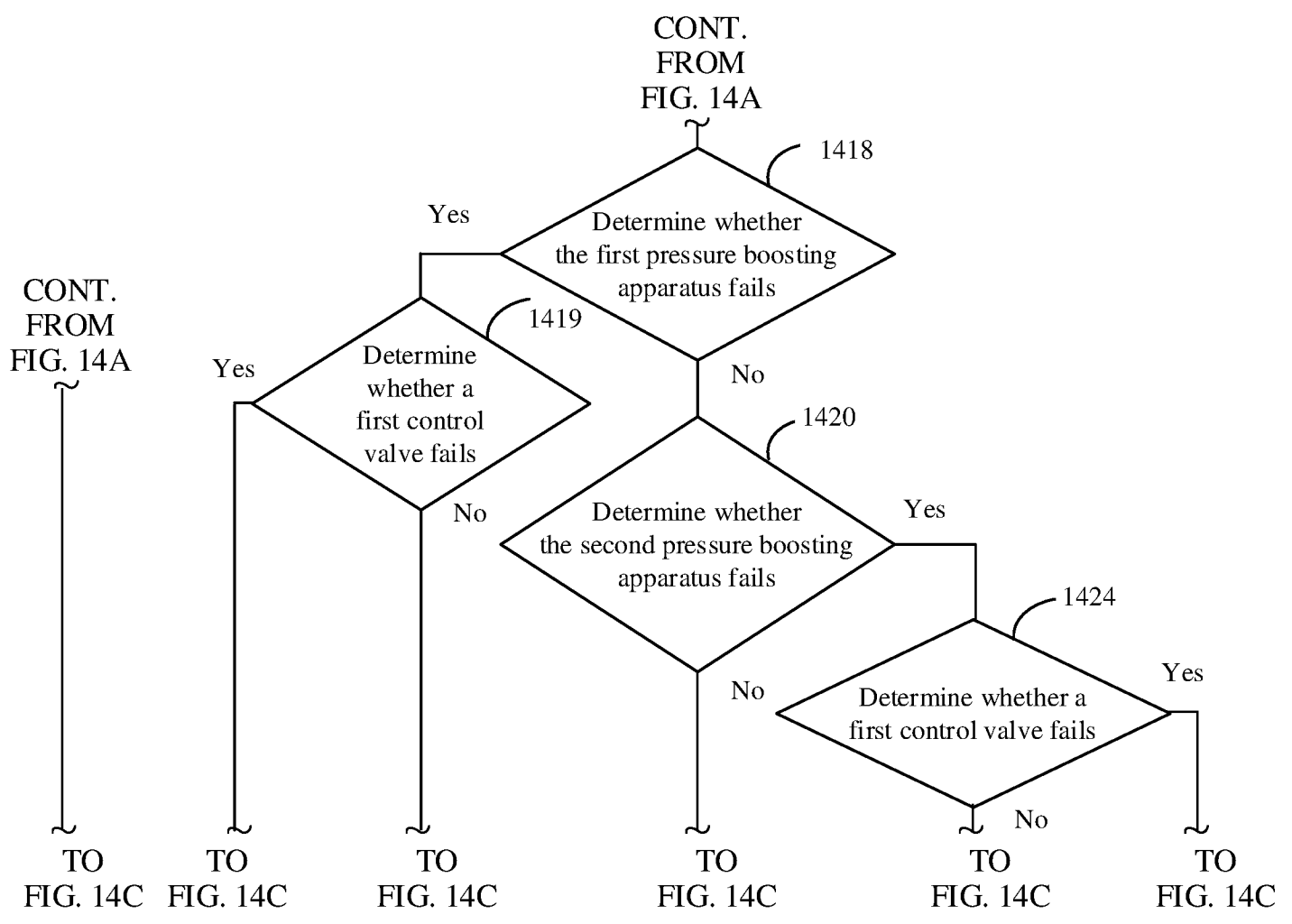

A control method for a brake system according to another embodiment of this application is described below with reference to FIG. 14A, FIG. 14B, and FIG. 14C. The control method may be used in combination with the brake system 300 or the vehicle 400. The method shown in FIG. 14A, FIG. 14B, and FIG. 14C includes step 1410 to step 1426.

1410: A controller determines a working mode of a brake system, and performs step 1411 if it is determined to enter a wire-controlled braking mode, or performs step 1412 if it is determined to enter an active braking mode.

1411: The controller determines whether a pedal travel sensor 420 fails, and performs step 1413 if the pedal travel sensor 420 fails, or performs step 1414 if the pedal travel sensor 420 works normally.

1413: The controller determines whether a pressure sensor 330 fails, and performs step 1415 if the pressure sensor 330 fails, or performs step 1414 if the pressure sensor 330 works normally.

1415: The controller notifies a driver that a brake system enters a manual braking working mode.

Specifically, the foregoing notification manner may be presented by using a user interface or in a voice prompt manner. This is not limited in this embodiment of this application.

1414: The controller calculates a total brake force requirement of a pedal, and performs step 1416.

1412: The controller calculates, by using a self-driving controller (for example, an ADAS), brake force required by a vehicle, and then performs step 1416.

1416: The controller determines whether both a first pressure boosting apparatus 110 and a second pressure boosting apparatus 120 fail, and performs step 1415 if both the first pressure boosting apparatus 110 and the second pressure boosting apparatus 120 fail, or performs step 1417 if not both the first pressure boosting apparatus 110 and the second pressure boosting apparatus 120 fail.

1417: The controller calculates pressure boosting brake force, to determine brake force that needs to be provided by a pressure boosting apparatus (the first pressure boosting apparatus 110 and/or the second pressure boosting apparatus 120), and performs step 1418.

1418: The controller determines whether the first pressure boosting apparatus 110 fails, and performs step 1419 if the first pressure boosting apparatus 110 fails, or performs step 1420 if the first pressure boosting apparatus 110 does not fail.

It should be noted that step 1418 is performed when not both the first pressure boosting apparatus 110 and the second pressure boosting apparatus 120 fail. In this case, when step 1419 is performed, the second pressure boosting apparatus 120 does not fail.

1419: The controller determines whether a first control valve 130 fails, and performs step 1421 if the first control valve 130 fails, or performs step 1422 if the first control valve 130 does not fail.

1421: The controller controls the second pressure boosting apparatus 120 to work, a second control valve 310 to be in an disconnected state, and fluid outlet valves (13, 14, 15, and 16) to be in a connected state.

1422: The controller controls the second pressure boosting apparatus 120 to work and a second control valve 310 to be in a connected state.

1420: The controller determines whether the second pressure boosting apparatus 120 fails, and performs step 1423 if the second pressure boosting apparatus 120 fails, or performs step 1424 if the second pressure boosting apparatus 120 does not fail.

It should be noted that step 1424 is performed when not both the first pressure boosting apparatus 110 and the second pressure boosting apparatus 120 fail. In this case, when step 1424 is performed, the first pressure boosting apparatus 110 does not fail.

1423: The controller determines that the first pressure boosting apparatus 110 and the second pressure boosting apparatus 120 work simultaneously to provide brake force for brake wheel cylinders (17, 18, 19, and 20). In this case, the first control valve 130 is in an disconnected state.

1424: The controller determines whether a first control valve 130 fails, and performs step 1425 if the first control valve 130 fails, or performs step 1426 if the first control valve 130 does not fail.

1425: The controller controls the first pressure boosting apparatus 110 to work, a second control valve 310 to be in an disconnected state, and fluid outlet valves (13, 14, 15, and 16) to be in a connected state.

1426: The controller controls the first pressure boosting apparatus 110 to work and a second control valve 310 to be in a connected state.

It should be understood that in this embodiment of this application, the memory may include a read-only memory and a random access memory, and provide an instruction and data to the processor. A part of the processor may further include a non-volatile random access memory. For example, the processor may further store information of a device type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A brake system, comprising:
    a first pressure boosting apparatus configured to adjust pressure of brake fluid in a first brake pipe to control a braking force applied to a first group of wheels of a vehicle;
    a second pressure boosting apparatus configured to adjust pressure of brake fluid in a second brake pipe to control a braking force applied to a second group of wheels of the vehicle;
    a first control valve configured to connect the first brake pipe to the second brake pipe;
    a fluid storage apparatus for storing the brake fluid;
    a fluid outlet pipe;
    a plurality of fluid outlet valves, wherein the plurality of fluid outlet valves includes at least one first fluid outlet valve configured to connect the fluid outlet pipe to the first brake pipe and at least one second fluid outlet valve configured to connect the fluid outlet pipe to the second brake pipe;
    a second control valve configured to connect the fluid outlet pipe to the fluid storage apparatus; and
    a controller configured to operate the brake system in a plurality of configurations, wherein the plurality of configurations includes a first configuration in which the first control valve is in a disconnected state, the fluid outlet valves are in a connected state, and the second control valve is in a disconnected state to connect the first brake pipe to the second group of wheels via the fluid outlet pipe such that adjustment of pressure of the brake fluid in the first brake pipe by the first pressure boosting apparatus controls the braking force applied to both the first and second groups of wheels;
    wherein the first configuration corresponds to failure of both the second pressure boosting apparatus and the first control valve.

2. The brake system according to claim 1, wherein when the first control valve is in a connected state, the first pressure boosting apparatus is configured to adjust the pressure of the brake fluid in the first brake pipe in order to adjust the pressure of the brake fluid in the second brake pipe.

3. The brake system according to claim 1, wherein when the first control valve is in a connected state, the second pressure boosting apparatus is configured to adjust the pressure of the brake fluid in the second brake pipe in order to adjust the pressure of the brake fluid in the first brake pipe.

4. The brake system according to claim 1, further comprising:
    a tandem master brake cylinder, wherein
        a first chamber of the master brake cylinder communicates with the first brake pipe, and is configured to adjust the pressure of the brake fluid in the first brake pipe in order to control the brake force applied to the first group of wheels, and
        a second chamber of the master brake cylinder communicates with the second brake pipe, and is configured to adjust the pressure of the brake fluid in the second brake pipe in order to control the brake force applied to the second group of wheels.

5. The brake system according to claim 4, wherein when the first control valve is in a connected state, the master brake cylinder is configured to adjust the pressure of the brake fluid in the first brake pipe by using the first chamber in order to adjust the pressure of the brake fluid in the second brake pipe.

6. The brake system according to claim 4, wherein when the first control valve is in a connected state, the master brake cylinder is configured to adjust the pressure of the brake fluid in the second brake pipe by using the second chamber in order to adjust the pressure of the brake fluid in the first brake pipe.

7. The brake system according to claim 1,
    wherein pressure outlet ports of the plurality of fluid outlet valves are connected to a pressure inlet port of the fluid outlet pipe;
    wherein a pressure outlet port of the fluid outlet pipe is connected to an inlet port of the fluid storage apparatus; and
    wherein the second control valve is located on the fluid outlet pipe between the pressure inlet port of the fluid outlet pipe and the inlet port of the fluid storage apparatus.

8. The brake system according to claim 7, wherein when the second control valve is in the open state and the plurality of fluid outlet valves are in the closed state, a target pressure boosting apparatus is configured to adjust pressure of brake fluid in the fluid outlet pipe in order to control the brake force applied to the first group of wheels and/or the second group of wheels; and
    wherein the target pressure boosting apparatus is the master brake cylinder, the first pressure boosting apparatus, or the second pressure boosting apparatus.

9. The brake system according to claim 1, wherein the controller is configured to:
    send first control information to the first pressure boosting apparatus in order to control the brake force applied by the first pressure boosting apparatus to the first group of wheels.

10. The brake system according to claim 9, further comprising:
    a tandem master brake cylinder, wherein a first chamber of the master brake cylinder communicates with the first brake pipe, and is configured to adjust the pressure of the brake fluid in the first brake pipe in order to control the brake force applied to the first group of wheels, and wherein a second chamber of the master brake cylinder communicates with the second brake pipe, and is configured to adjust the pressure of the brake fluid in the second brake pipe in order to control the brake force applied to the second group of wheels; and a pressure sensor located on the first brake pipe between a pressure outlet port of the master brake cylinder and a pressure outlet port of the first pressure boosting apparatus, wherein the pressure sensor is configured to:
  detect the pressure of the brake fluid in the first brake pipe and adjusted by the master brake cylinder, and
  send pressure information indicating the pressure to the controller for determining, based on the pressure, brake force applied to a wheel of the vehicle.

11. The brake system according to claim 10, further comprising:
  a pedal travel sensor configured to:
    detect a traveling distance of a brake pedal of the vehicle, and
    send traveling distance information indicating the traveling distance to the controller for determining, based on the traveling distance, the brake force applied to the wheel of the vehicle.

12. The brake system according to claim 1, wherein the controller is further configured to:
  send second control information to the second pressure boosting apparatus in order to control the brake force applied by the second pressure boosting apparatus to the second group of wheels.

13. The brake system according to claim 1, wherein:
  the first group of wheels comprise a right front wheel and a left front wheel, and the second group of wheels comprise a right rear wheel and a left rear wheel, or
  the first group of wheels comprise a right front wheel and a left rear wheel, and the second group of wheels comprise a left front wheel and a left rear wheel.

14. The brake system according to claim 1, further comprising:
  a tandem master brake cylinder configured to be actuated by a brake pedal, wherein the tandem master brake cylinder comprises a first chamber corresponding to the first brake pipe and a second chamber corresponding to the second brake pipe; and
  wherein the plurality of configurations include:
    a second configuration in which: the first control valve is in a closed state to isolate the first brake pipe from the second brake pipe, adjustment of pressure of the brake fluid in the first brake pipe by the first pressure boosting apparatus controls the brake force applied to the first group of wheels, and adjustment of pressure of the brake fluid in the second brake pipe by the second pressure boosting apparatus controls the brake force applied to the second group of wheels;
    a third configuration in which: the first control valve is in an open state to connect the first brake pipe to the second brake pipe, and adjustment of pressure of the brake fluid in the first brake pipe by the first pressure boosting apparatus controls the braking force applied to both the first and second groups of wheels; and
    a fourth configuration in which: the tandem master brake cylinder adjusts pressure of the brake fluid in both the first and second brake pipes to control the braking force applied to both the first and second groups of wheels;
  wherein the third configuration corresponds to failure of the second pressure boosting apparatus, and wherein the fourth configuration corresponds to failure of both the first and second boosting apparatuses.

15. A vehicle, comprising:
  a brake system, wherein the brake system comprises:
    a first pressure boosting apparatus configured to adjust pressure of brake fluid in a first brake pipe to control a braking force applied to a first group of wheels of a vehicle;
    a second pressure boosting apparatus configured to adjust pressure of brake fluid in a second brake pipe to control a braking force applied to a second group of wheels of the vehicle;
    a first control valve configured to connect the first brake pipe to the second brake pipe;
    a fluid storage apparatus for storing the brake fluid;
    a fluid outlet pipe;
    a plurality of fluid outlet valves, wherein the plurality of fluid outlet valves includes at least one fluid outlet valve configured to connect the fluid outlet pipe to the first brake pipe and at least one second fluid outlet valve configured to connect the fluid outlet pipe to the second brake pipe;
    a second control valve configured to connect the fluid outlet pipe to the fluid storage apparatus; and
    a controller configured to operate the brake system in a plurality of configurations, wherein the plurality of configurations includes a first configuration in which the first control valve is in a disconnected state, the fluid outlet valves are in a connected state, and the second control valve is in a disconnected state to connect the first brake pipe to the second group of wheels via the fluid outlet pipe such that adjustment of pressure of the brake fluid in the first brake pipe by the first pressure boosting apparatus controls the braking force applied to both the first and second groups of wheels;
    wherein the first configuration corresponds to failure of both the second pressure boosting apparatus and the first control valve.

16. The vehicle of claim 15, wherein when the first control valve is in a connected state, the first pressure boosting apparatus is configured to adjust the pressure of the brake fluid in the first brake pipe in order to adjust the pressure of the brake fluid in the second brake pipe.

17. The vehicle of claim 15, wherein when the first control valve is in a connected state, the second pressure boosting apparatus is configured to adjust the pressure of the brake fluid in the second brake pipe in order to adjust the pressure of the brake fluid in the first brake pipe.

18. The vehicle of claim 15, further comprising:
  a tandem master brake cylinder, wherein a first chamber of the master brake cylinder communicates with the first brake pipe, and is configured to adjust the pressure of the brake fluid in the first brake pipe in order to control the brake force applied to the first group of wheels, and a second chamber of the master brake cylinder communicates with the second brake pipe, and is configured to adjust the pressure of the brake fluid in the second brake pipe in order to control the brake force applied to the second group of wheels.

19. The vehicle of claim 18, wherein when the first control valve is in a connected state, the master brake cylinder is configured to adjust the pressure of the brake fluid in the first brake pipe by using the first chamber in order to adjust the pressure of the brake fluid in the second brake pipe.

20. The vehicle of claim 15,
  wherein pressure outlet ports of the plurality of fluid outlet valves are connected to a pressure inlet port of the fluid outlet pipe;

wherein a pressure outlet port of the fluid outlet pipe is connected to an inlet port of the fluid storage apparatus; and wherein the second control valve is located on the fluid outlet pipe between the pressure inlet port of the fluid outlet pipe and the inlet port of the fluid storage apparatus.

* * * * *